United States Patent
Dallaire et al.

(10) Patent No.: US 9,660,841 B2
(45) Date of Patent: *May 23, 2017

(54) CIRCUIT AND METHOD FOR PERFORMING ADAPTION ON ALL RECEIVER BRANCHES

(71) Applicant: INPHI CORPORATION, Santa Clara, CA (US)

(72) Inventors: Stephane Dallaire, Quebec (CA); Benjamin P. Smith, Ontario (CA); Travis William Lovitt, Ontario (CA); Arash Farhoodfar, Milpitas, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/260,692

(22) Filed: Sep. 9, 2016

(65) Prior Publication Data

US 2016/0380784 A1 Dec. 29, 2016

Related U.S. Application Data

(63) Continuation of application No. 14/806,346, filed on Jul. 22, 2015, now Pat. No. 9,467,315.

(Continued)

(51) Int. Cl.
*H03K 9/00* (2006.01)
*H04L 27/01* (2006.01)
(Continued)

(52) U.S. Cl.
CPC ......... *H04L 25/03019* (2013.01); *H04B 1/10* (2013.01); *H04L 25/03057* (2013.01);
(Continued)

(58) Field of Classification Search
USPC ............... 375/219, 220, 222, 223, 229–236, 375/240.02–240.07, 240.26–240.29, 259,
(Continued)

(56) References Cited

U.S. PATENT DOCUMENTS 7,529,296 B2 * 5/2009 Jaussi ............... H04L 25/03057
333/18
9,209,825 B1 12/2015 Visani et al.
(Continued)

OTHER PUBLICATIONS

Dallaire, Stephane, et al., U.S. Appl. No. 14/921,251, entitled "System and Method for Adjusting Clock Phases in a Time-Interleaved Receiver," filed Oct. 23, 2015, consisting of 40 pages and 13 drawing sheets, not yet published but expected to be published in Apr. 2017, and currently available internally at the USPTO.
(Continued)

*Primary Examiner* — Linda Wong
(74) *Attorney, Agent, or Firm* — Richard T. Ogawa; Ogawa P.C.

(57) ABSTRACT

Receiver circuitry is disclosed that can take circuit branches offline to possibly adapt an offset value. In one embodiment, a circuit in a receiver has at least two branches. Each branch includes an adjustor to adjust the branch signal by an offset value. Selection circuitry takes one of the branches offline by selecting the output of that branch as an offline value, and by selecting the output of one or more of the other branches as a data decision value. The selection circuitry changes which branch is taken offline during the operation of the circuit. When a branch is taken offline, an offset value associated with that branch may be updated, if necessary.

22 Claims, 17 Drawing Sheets

Related U.S. Application Data

(60) Provisional application No. 62/027,520, filed on Jul. 22, 2014.

(51) Int. Cl.

| | | |
|---|---|---|
| *H03H 7/30* | (2006.01) | |
| *H04L 25/03* | (2006.01) | |
| *H04L 25/06* | (2006.01) | |
| *H04B 1/10* | (2006.01) | |
| *H04L 12/26* | (2006.01) | |

(52) U.S. Cl.
CPC .......... *H04L 25/061* (2013.01); *H04L 43/028* (2013.01); *H04L 2025/03363* (2013.01); *H04Q 2213/03* (2013.01)

(58) Field of Classification Search
USPC ....... 375/271, 278, 284, 285, 295, 302, 316, 375/322, 324, 346, 3, 50, 320, 300
See application file for complete search history.

(56) References Cited

U.S. PATENT DOCUMENTS

| | | | |
|---|---|---|---|
| 2004/0234002 A1 | 11/2004 | Yang et al. | |
| 2008/0165841 A1* | 7/2008 | Wall ......................... | H03L 7/08 375/232 |
| 2011/0021170 A1 | 1/2011 | Kolze et al. | |
| 2011/0051854 A1* | 3/2011 | Kizer ................... | H04L 25/4919 375/340 |
| 2011/0068840 A1 | 3/2011 | Williams et al. | |
| 2011/0095927 A1* | 4/2011 | Pagnanelli ............ | H03M 3/468 341/166 |
| 2014/0064351 A1* | 3/2014 | Hidaka ................... | H04L 27/01 375/232 |
| 2014/0140389 A1* | 5/2014 | Chen ................... | H04L 25/4917 375/233 |
| 2014/0226707 A1* | 8/2014 | Kaviani ............ | H04L 25/03063 375/233 |
| 2014/0241477 A1* | 8/2014 | Eliaz ................. | H04L 25/03178 375/348 |
| 2016/0056980 A1 | 2/2016 | Wang et al. | |

OTHER PUBLICATIONS

Office Action for U.S. Appl. No. 14/806,346, dated Mar. 9, 2016, 31 pages.

Yang, et al, "High-Performance Adaptive Decision Feedback Equalizer Based on Predictive Parallel Branch Slicer Scheme," 2002 IEEE Workshop on Signal Processing Systems (SIPS'02), San Diego, CA, USA, Oct. 16-18, 2002, pp. 121-126.

Non-Final Office Action mailed May 10, 2016 for U.S. Appl. No. 14/921,251, 16 pages.

Notice of Allowance for U.S. Appl. No. 14/806,346, dated Jun. 9, 2016, 20 pages.

\* cited by examiner

| Selected Error Path 1002 | Path 0 Offset select value 1012 | Path 1 Offset select value 1014 | Path 2 Offset select value 1016 | Path 3 Offset select value 1018 | Path 4 Offset select value 1020 | $\hat{e}(k)$ used to update taps? |
|---|---|---|---|---|---|---|
| Path 3 | $-b_1-b_2$ | $-b_1+b_2$ | $b_1-b_2$ | $b_1-b_2-1$ | $b_1+b_2$ | Only when it is determined that $\hat{m}(k-T)=1$ and $\hat{m}(k-2T)=-1$ and $\hat{m}(k)=-1$ |
| Path 3 | $-b_1-b_2$ | $-b_1+b_2$ | $b_1-b_2$ | $b_1-b_2+1$ | $b_1+b_2$ | Only when it is determined that $\hat{m}(k-T)=1$ and $\hat{m}(k-2T)=-1$ and $\hat{m}(k)=1$ |
| Path 2 | $-b_1-b_2$ | $-b_1+b_2$ | $-b_1+b_2-1$ | $b_1-b_2$ | $b_1+b_2$ | Only when it is determined that $\hat{m}(k-T)=-1$ and $\hat{m}(k-2T)=1$ and $\hat{m}(k)=-1$ |
| Path 2 | $-b_1-b_2$ | $-b_1+b_2$ | $-b_1+b_2+1$ | $b_1-b_2$ | $b_1+b_2$ | Only when it is determined that $\hat{m}(k-T)=-1$ and $\hat{m}(k-2T)=1$ and $\hat{m}(k)=1$ |
| Path 1 | $-b_1-b_2$ | $-b_1-b_2-1$ | $-b_1+b_2$ | $b_1-b_2$ | $b_1+b_2$ | Only when it is determined that $\hat{m}(k-T)=-1$ and $\hat{m}(k-2T)=-1$ and $\hat{m}(k)=-1$ |
| Path 1 | $-b_1-b_2$ | $-b_1-b_2+1$ | $-b_1+b_2$ | $b_1-b_2$ | $b_1+b_2$ | Only when it is determined that $\hat{m}(k-T)=-1$ and $\hat{m}(k-2T)=-1$ and $\hat{m}(k)=1$ |
| Path 0 | $-b_1-b_2-1$ | $-b_1+b_2$ | $-b_1+b_2$ | $b_1-b_2$ | $b_1+b_2$ | Only when it is determined that $\hat{m}(k-T)=-1$ and $\hat{m}(k-2T)=-1$ and $\hat{m}(k)=-1$ |
| Path 0 | $-b_1-b_2+1$ | $-b_1+b_2$ | $-b_1+b_2$ | $b_1-b_2$ | $b_1+b_2$ | Only when it is determined that $\hat{m}(k-T)=-1$ and $\hat{m}(k-2T)=-1$ and $\hat{m}(k)=1$ |
| Path 1 | $-b_1-b_2$ | $-b_1+b_2-1$ | $-b_1+b_2$ | $b_1-b_2$ | $b_1+b_2$ | Only when it is determined that $\hat{m}(k-T)=-1$ and $\hat{m}(k-2T)=1$ and $\hat{m}(k)=-1$ |
| Path 1 | $-b_1-b_2$ | $-b_1+b_2+1$ | $-b_1+b_2$ | $b_1-b_2$ | $b_1+b_2$ | Only when it is determined that $\hat{m}(k-T)=-1$ and $\hat{m}(k-2T)=1$ and $\hat{m}(k)=1$ |
| Path 2 | $-b_1-b_2$ | $-b_1+b_2$ | $b_1-b_2-1$ | $b_1-b_2$ | $b_1+b_2$ | Only when it is determined that $\hat{m}(k-T)=1$ and $\hat{m}(k-2T)=-1$ and $\hat{m}(k)=-1$ |
| Path 2 | $-b_1-b_2$ | $-b_1+b_2$ | $b_1-b_2+1$ | $b_1-b_2$ | $b_1+b_2$ | Only when it is determined that $\hat{m}(k-T)=1$ and $\hat{m}(k-2T)=-1$ and $\hat{m}(k)=1$ |
| Path 3 | $-b_1-b_2$ | $-b_1+b_2$ | $b_1-b_2$ | $b_1+b_2-1$ | $b_1+b_2$ | Only when it is determined that $\hat{m}(k-T)=1$ and $\hat{m}(k-2T)=1$ and $\hat{m}(k)=-1$ |
| Path 3 | $-b_1-b_2$ | $-b_1+b_2$ | $b_1-b_2$ | $b_1+b_2+1$ | $b_1+b_2$ | Only when it is determined that $\hat{m}(k-T)=1$ and $\hat{m}(k-2T)=1$ and $\hat{m}(k)=1$ |
| Path 4 | $-b_1-b_2$ | $-b_1+b_2$ | $b_1-b_2$ | $b_1+b_2$ | $b_1+b_2-1$ | Only when it is determined that $\hat{m}(k-T)=1$ and $\hat{m}(k-2T)=1$ and $\hat{m}(k)=-1$ |
| Path 4 | $-b_1-b_2$ | $-b_1+b_2$ | $b_1-b_2$ | $b_1+b_2$ | $b_1+b_2+1$ | Only when it is determined that $\hat{m}(k-T)=1$ and $\hat{m}(k-2T)=1$ and $\hat{m}(k)=1$ |

FIG. 9

CIRCUIT AND METHOD FOR PERFORMING ADAPTION ON ALL RECEIVER BRANCHES

PRIORITY CLAIM

This application is a continuation of, and claims priority to each of, U.S. patent application Ser. No. 14/806,346 (now U.S. Pat. No. 9,467,315), filed Jul. 22, 2015, and entitled "Circuit and Method for Performing Adaptation on All Receiver Branches", which claims priority to U.S. Provisional Patent Application Ser. No. 62/027,520, filed on Jul. 22, 2014, which applications are hereby incorporated herein by reference.

FIELD

The following relates to methods and circuitry in a receiver.

BACKGROUND

When a signal is processed at a receiver, the signal may be adjusted by an offset. As an example, an adaptive decision feedback equalizer may include at least one circuit branch in which the signal in the branch is adjusted by an offset and then sliced. As another example, a 4-PAM detector may include a circuit branch for each decision threshold. The signal in each circuit branch may be adjusted by an offset having a value corresponding to the decision threshold. In these two examples, the offset may be a DC value that is added to or subtracted from the signal.

However, in some cases the offset values used in the receiver may deviate from their optimal values, and this may affect the performance of the receiver.

SUMMARY

Embodiments are described in which a circuit in a receiver has a plurality of branches, with each branch including an adjustor to adjust the branch signal by an offset value. Selection circuitry takes one of the branches offline by selecting the output of that branch as an offline value, and by selecting the output of one or more of the other branches as a data decision value. The selection circuitry changes which branch is taken offline during the operation of the circuit. When a branch is taken offline, an offset value associated with that branch may be updated.

In one embodiment, there is provided a circuit for use in a receiver. The circuit comprises a plurality of branches. Each one of the branches is to receive the same input signal, and each one of the branches includes: an adjustor to adjust an input of the adjustor by an offset, and decision circuitry downstream from the adjustor to convert an input of the decision circuitry to one of two possible output values. The offset associated with at least one of the branches is selectable from a finite number of values, and the offset selected is to change during operation of the circuit. The circuit further comprises selection circuitry coupled to an output of each of the branches. The selection circuitry is to select the output of one the branches as an offline value and to select the output of one or more other of the branches as a data decision value. The selection circuitry is further to change which output of the branches is selected as the offline value during the operation of the circuit such that each one of the branches has its output selected as the offline value at a respective different point in time during the operation of the circuit.

In another embodiment, there is provided a method of operating a circuit in a receiver. The method comprises receiving the same signal at an input of each one of a plurality of branches. Each one of the branches includes an adjustor and decision circuitry downstream from the adjustor. In each one of the branches, the following is performed: adjusting an input of the adjustor by an offset, and converting an input of the decision circuitry to one of two possible output values. The method further comprises selecting an output of one of the branches as an offline value, and selecting an output of one or more other of the branches as a data decision value. The following is also performed during operation of the circuit: (i) changing a value of the offset associated with at least one of the branches, the value of the offset being changed from one of a finite number of values to another of the finite number of values; and (ii) changing which output of the branches is selected as the offline value such that each one of the branches has its output selected as the offline value at a respective different point in time during the operation of the circuit.

Other aspects and features will become apparent to those of ordinarily skill in the art upon review of the following description.

BRIEF DESCRIPTION OF THE DRAWINGS

Embodiments will be described, by way of example only, with reference to the accompanying figures wherein:

FIG. 9 is a table illustrating the configuration of the offset values in the adaptive decision feedback equalizer of FIG. 8;

DETAILED DESCRIPTION

For illustrative purposes, specific example embodiments will now be explained in greater detail below in conjunction with the figures.

The embodiments set forth herein represent information sufficient to practice the claimed subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Figure 1:
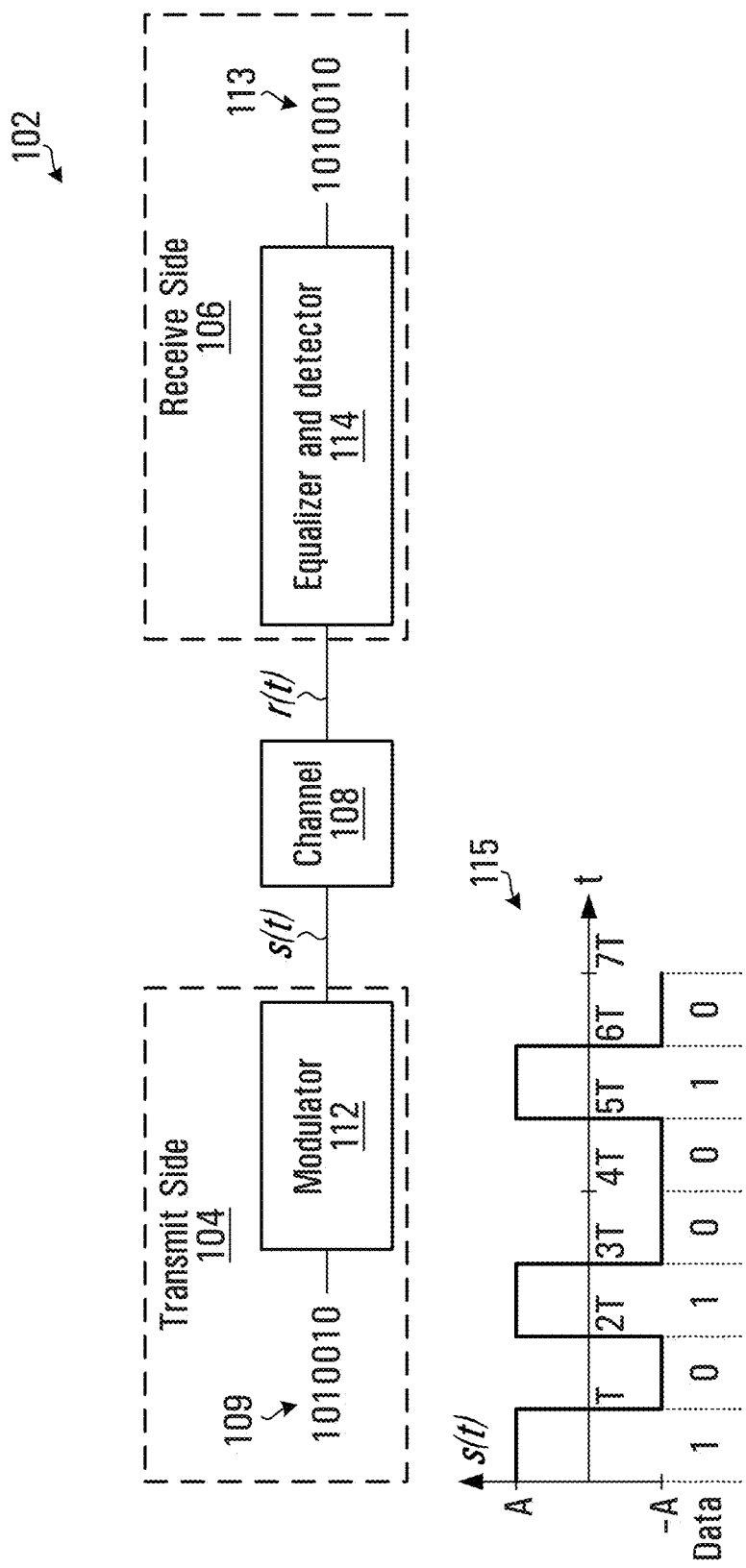
FIG. 1 is a block diagram of an embodiment of a digital communications system.

With reference to FIG. 1, a block diagram of an embodiment of a digital communications system 102 is illustrated. The digital communications system 102 comprises a transmit side 104 and a receive side 106, separated by a communications channel 108. For example, the transmit side 104 may comprise a transmitter, and the receive side 106 may comprise a receiver. The transmit side 104 includes a modulator 112, and the receive side 106 includes an equalizer and detector 114.

During operation, a stream of binary digits 109 ("bits") is to be sent from the transmit side 104 to the receive side 106. The channel 108 cannot support the literal propagation of the stream of bits directly (i.e. the channel medium cannot literally carry 1's and 0's). Instead, the bits 109 need to be mapped or modulated onto corresponding waveforms that can propagate through the channel 108. This is achieved using the modulator 112.

In this example the modulator 112 performs binary pulse amplitude modulation (binary-PAM) or non-return-to-zero (NRZ), such that it outputs a waveform s(t) in which the information bit 1 is represented by a rectangular pulse of amplitude A (a positive voltage) and the information bit 0 is represented by a rectangular pulse of amplitude −A (a negative voltage). This is shown by reference character 115 in FIG. 1. For ease of explanation hereafter, it will be assumed that A=1, it being understood that A can be another value instead.

The transmitted waveform s(t) propagates through the channel 108 and is corrupted by noise. The channel 108 is bandlimited and disperses and/or spreads the waveform s(t) passing through it. This degradation of the waveform s(t) is referred to as intersymbol interference (ISI), and it is desired to mitigate the effect of the ISI at the receive side 106 via equalization. The received signal r(t) is therefore subject to equalization and detection in the equalizer and detector 114. The output of the equalizer and detector 114 is a detected digital bit stream 113.

The digital communications system 102 has been simplified for ease of explanation. In actual implementation, the transmit side 104 and the receive side 106 may include other components, which may be related to the transmission of the data, depending upon the specific implementation. Examples of such components include (but are not limited to): pre-equalization/pre-emphasis, scrambling/descrambling, encoding/decoding (such as 8B/10B or 64B/66B), and forward error correction (FEC) encoding and decoding to improve bit error rate. As one specific example, it is common to perform pre-equalization in the transmitter, which is also referred to as pre-emphasis.

Figure 2:
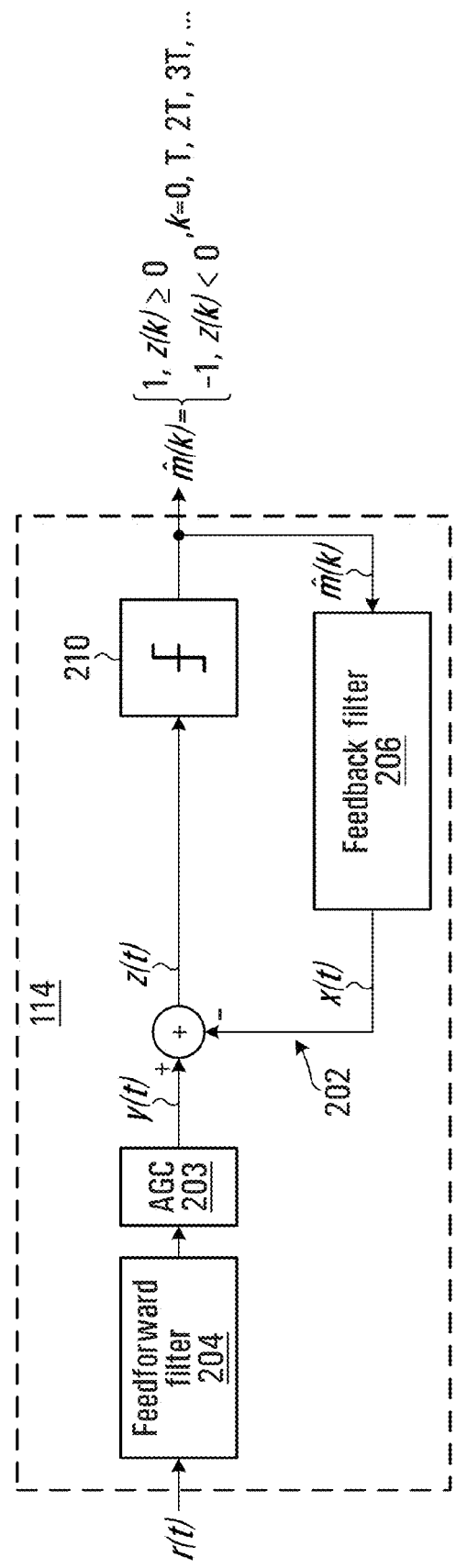
FIG. 2 illustrates an example of the equalizer and detector of FIG. 1.

FIG. 2 illustrates an example of the equalizer and detector 114 of FIG. 1 in some more detail. In particular, the equalizer and detector 114 includes a feedforward filter 204 (such as a high pass filter), followed by an automatic gain control (AGC) block 203, followed by a decision feedback equalizer (DFE) 202 with a feedback filter 206 and decision circuitry 210. In operation, the received signal r(t) is first passed through the feedforward filter 204 to obtain a filtered signal, which is then subject to the AGC to result in signal y(t). The feedforward filter 204 and the AGC 203 are optional, but are shown in most illustrated embodiments. One or both may be omitted in some implementations. If both are omitted, then r(t)=y(t), assuming there is not some other sort of pre-processing of received signal r(t). Also, in embodiments in which the feedforward filter 204 and AGC 203 are present, it may be the case that the AGC 203 is instead applied before the feedforward filter 204.

In any case, the signal y(t) is adjusted by the output x(t) of the feedback filter 206 to produce an equalized signal z(t). For example, the output x(t) of the feedback filter 206 may be subtracted from the signal y(t) to obtain z(t), as illustrated. The feedback filter 206 feeds back a weighted version of previous decisions, such that x(t) helps mitigate the ISI introduced by previously transmitted data.

The equalized signal z(t) optionally passes through an amplifier (not shown in the illustrated embodiments), and then to the decision circuitry, which in this illustrated embodiment is a symbol detector in the form of a slicer 210, since binary PAM or NRZ is being used. The slicer 210 performs the symbol detection by outputting a "1" if the equalized signal z(t) at the sample point is greater than zero (this represents a decision of bit '1'), and by outputting a "−1" if the equalized signal z(t) at the sample point is less than zero (this represents a decision of bit '0'). The slicing occurs once every symbol period T so that a decision representing the symbol transmitted during each symbol period T is output each symbol period T. Thus, the output of the slicer is:

$$\hat{m}(k) = \begin{cases} 1, & z(k) \geq 0 \\ -1, & z(k) < 0 \end{cases}, k = 0, T, 2T, 3T, \ldots,$$

where T is the symbol period. The slicer 210 may be implemented using a flip-flop or clocked comparator, for example.

Figure 3:
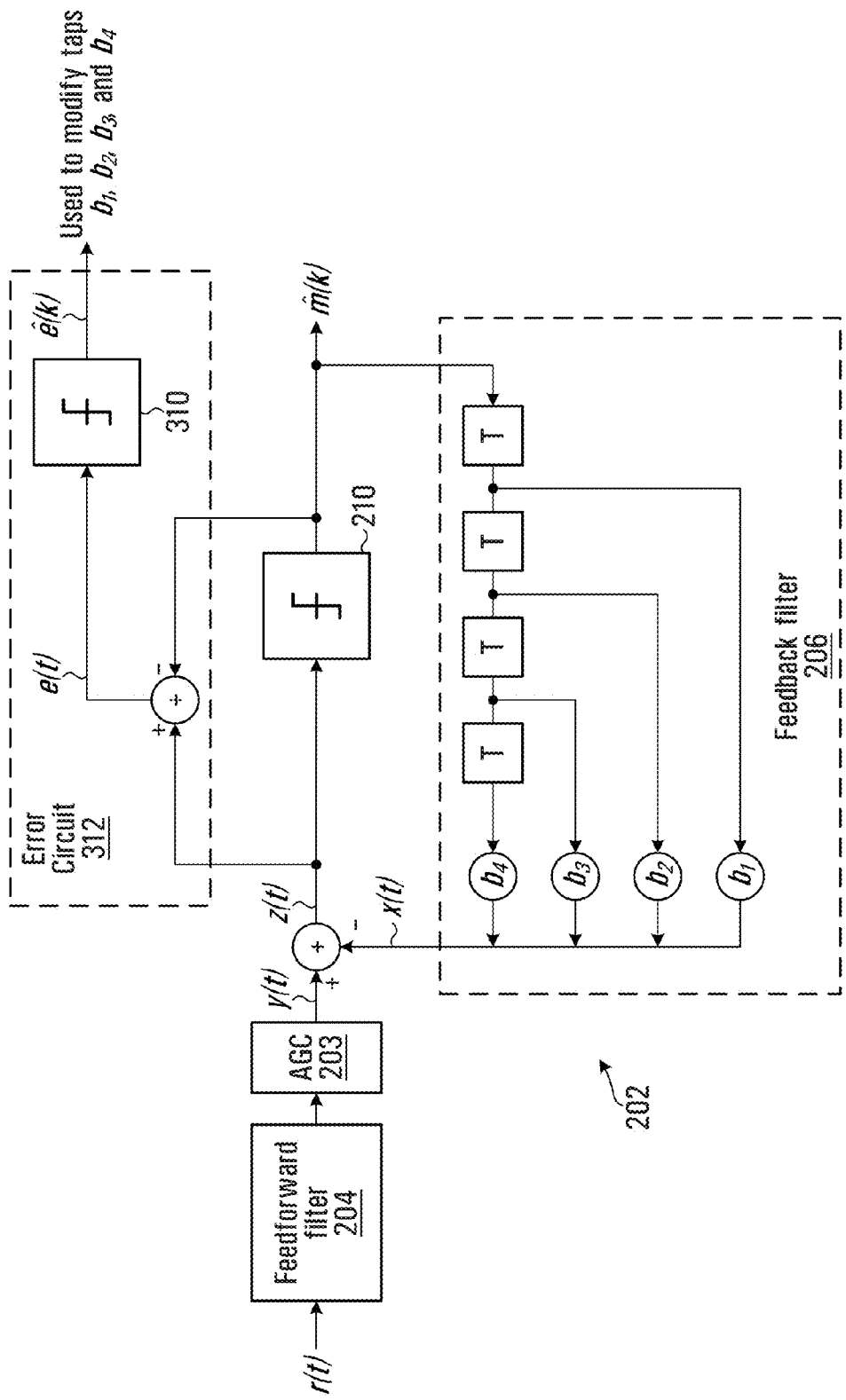
FIGS. 3 to 8 each illustrate an example embodiment of an adaptive decision feedback equalizer.

FIG. 3 illustrates a particular example of the DFE 202 in which the feedback filter 206 comprises a filter with 4 taps $b_1$, $b_2$, $b_3$, and $b_4$, such that the output of the feedback filter 206 x(t) is:

$$x(t) = b_1 \hat{m}(k-T) + b_2 \hat{m}(k-2T) + b_3 \hat{m}(k-3T) + b_4 \hat{m}(k-4T),$$

where $\hat{m}(k-T)$ is the previous decision, $\hat{m}(k-2T)$ is the decision two symbol periods ago, $\hat{m}(k-3T)$ is the decision three symbol periods ago, etc. That is, the output of the feedback filter 206 x(t) is a linear combination of previous decisions each weighted by a value $b_i$ referred to as a "tap".

Four taps ($b_1$, $b_2$, $b_3$, and $b_4$) are used as an example in this illustrated embodiment. More or fewer taps are possible. Also, the exact way in which the taps are combined with the previous decision values $$\left(i.e.\text{ the exact equation } x(t) = \sum_{i=1}^{r} b_i \hat{m}(k - iT)\right)$$

is only one example.

An offline error circuit 312 is also illustrated in the embodiment in FIG. 3. The error circuit is referred to as being "offline" as it is not on the data path, i.e., its output is not a data decision value, but is instead an offline value. The error circuit 312 produces an error signal e(t), which is representative of a difference between the equalized output z(t) and the decision $\hat{m}(k)$. This error signal e(t) can then be sliced via slicer 310 (after optional amplification) to result in sliced error value $\hat{e}(k)$, which represents the sign of the error (e.g. $\hat{e}(k)=1$ if $e(t) \geq 0$, and $\hat{e}(k)=-1$ if $e(t)<0$). Error signal e(t), or its sliced version, $\hat{e}(k)$, can then be used to adaptively update the value of taps $b_1$, $b_2$, $b_3$, and $b_4$. For example, one method, which is referred to as a sign-sign least-mean square (SS-LMS) method, is to update each tap $b_i$, at each symbol period T, as follows:

$$b_i^{n+1} = b_i^n + \mu \hat{e}(k) \hat{m}(k-iT)$$

where $\mu$ is a correlation coefficient scaling factor, $\hat{e}(k)$ represents the sliced error value, and $\hat{m}(k-iT)$ is the $i^{th}$ previous decision. The value n represents the iteration of the update. That is, the $(n+1)^{th}$ value of the tap $b_i$ is updated by adding the $n^{th}$ value of the tap $b_i$ to $\mu \hat{e}(k) \hat{m}(k-iT)$ In this SS-LMS method, each tap $b_i$ is updated each iteration by an amount $\mu$. When the sliced error value $\hat{e}(k)$ is not correlated with the decision $\hat{m}(k-iT)$, the term $\hat{e}(k)\hat{m}(k-iT)$ will average out to zero over time (i.e. it will average out to zero over multiple symbols). On the other hand, when the sliced error value $\hat{e}(k)$ is correlated with the decision $\hat{m}(k-iT)$, the term $\hat{e}(k)\hat{m}(k-iT)$ will be biased in one direction, which will cause the change in the value of the tap to be biased in one direction, and in this way the tap will adapt over time to its optimal value.

The SS-LMS method is only one possible way of updating the taps using the error signal. Other ways may instead be used. By way of example, other methods for updating the taps are: least-mean square (LMS), sign-data LMS (sign of the data, quantized error), and sign-error LMS (sign of error, quantized data, but not applicable to NRZ data). Sign-data LMS, Sign-error LMS, and SS-LMS are simplifications of the general LMS method.

The DFE illustrated in FIG. 3 is an adaptive DFE, as the taps $b_1$, $b_2$, $b_3$, and $b_4$ of the feedback filter 206 may be adapted over time. This is useful in that the characteristics of the channel 108 may change over time, such that the taps $b_1$, $b_2$, $b_3$, and $b_4$ may no longer be optimal. In other words, the taps may drift from their optimal value over time. However, adapting the taps as discussed above allows for the taps to be modified over time to try to follow the changing channel characteristics and move towards their optimal value. Another possible benefit of an adaptive DFE, such as that shown in FIG. 3, is that the equalizer may autonomously adjust its taps to the optimal values for a given channel, without having to manually program them.

In some implementations, it is difficult to compute the error signal e(t) in the manner discussed above and illustrated in FIG. 3, due to difficulty in meeting timing constraints. In particular, in a single symbol period T, the slicer 210 output $\hat{m}(k)$ must settle. The time for this to occur will be referred to as the "slicer delay" $D_s$. Then, the difference between $\hat{m}(k)$ and z(t) is calculated to output the error signal e(t). The time for this to occur will be referred to as the differential amplifier delay $D_{diffamp}$. All of this is to happen within the symbol period T. However, in high-speed implementations, $D_s + D_{diffamp}$ may almost be as long as the symbol period T, resulting in their not being enough time to safely compute the error signal e(t).

Figure 4:
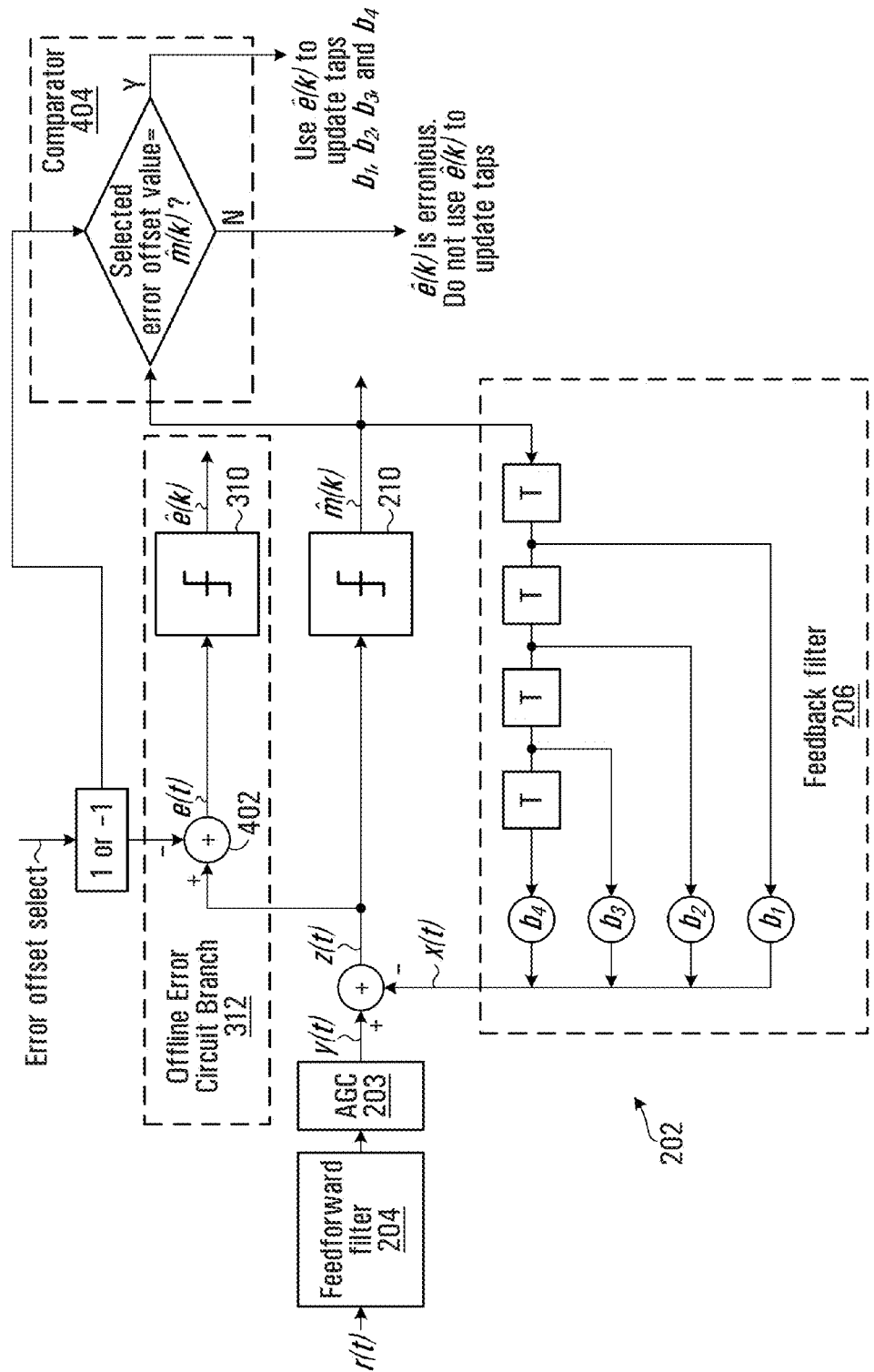

In view of the above, there is illustrated in FIG. 4 an adaptive DFE in which the error signal e(t) is instead calculated using an offline error circuit 312 that acts as an offline look-ahead branch. The offline error circuit 312 is an offline branch having the slicer 302 downstream from an adjustor 402. The adjustor 402 adjusts the equalized input z(t) by an offset of either +1 or −1. A comparator 404 compares whether the selected offset equals the actual decision value, and if so, then the taps are updated. In particular, operation is as follows: instead of waiting for the decision $\hat{m}(k)$, the selected error offset value corresponding to one of the two possible decision values ("1" or "−1") is subtracted from the equalized input z(t), as at adjustor 402, to result in the error signal e(t), which is then sliced via slicer 310 to obtain the sliced error value $\hat{e}(k)$. Then, the actual decision, $\hat{m}(k)$, once available, is compared to the selected error offset value, via the comparator 404. If the decision $\hat{m}(k)$ and the selected error offset value do not match, then the sliced error value $\hat{e}(k)$ is considered to be erroneous and is ignored. On the other hand, if the decision $\hat{m}(k)$ and the selected error offset value do match, then the sliced error value $\hat{e}(k)$ is valid and is used to update the taps $b_1$, $b_2$, $b_3$, and $b_4$. The selected error offset value can be periodically toggled between "1" and "−1" over time.

The comparator 404 is an example of comparison circuitry. The comparator 404 operates as follows: the input values are compared to see if the condition to be compared is satisfied. If so, one value is output (e.g. a "1"), and if not another value is output (e.g. a "0"). Specifically, for comparator 404, one value (e.g. a "1") can be output if the decision $\hat{m}(k)$ and the selected error offset value are the same, indicating that the error value is not erroneous. Another value (e.g. a "0") can be output if the decision and the selected error offset value are not the same, indicating that the error value is erroneous.

A possible benefit of this adaptive DFE illustrated in FIG. 4 is that it relaxes the timing requirement for generating $\hat{e}(k)$ compared to generating $\hat{e}(k)$ in the manner shown in FIG. 3. A possible drawback of the FIG. 4 adaptive DFE is that the taps $b_1$, $b_2$, $b_3$, and $b_4$ cannot be updated every symbol period. Instead, the taps can only be updated when the decision $\hat{m}(k)$ and the selected error offset value match. However, not updating the taps every symbol period is generally not a problem, as the taps $b_1$, $b_2$, $b_3$, and $b_4$ usually only drift from their optimum value relatively slowly and therefore do not need to be updated every symbol period.

In an alternative embodiment, not illustrated, it is possible to modify the FIG. 4 configuration to instead have two offline error circuits 312, one with its offset set to the "+1" decision level, and the other one with its offset set to the "−1" decision level. The valid error value is then selected among the two candidate error values based on the actual decision $\hat{m}(k)$. This implementation results in one of the error values being valid and used to update the taps every symbol period. The drawback is the overhead of having two instances of error circuit 312 instead of one.

For optimal tap adaptation, the offline branch 312 used to generate $\hat{e}(k)$, comprising slicer 310 (and possibly other components not illustrated, such as optional amplification prior to slicing), should be the same as the circuit used to generate the decision $\hat{m}(k)$, comprising slicer 210. To assist in trying to achieve this, the error signal circuitry 312 can be a replica of the circuit used to generate the decision $\hat{m}(k)$ (to the extent they include the same components). However, even if the error circuit 312 is a replica of the circuit used to generate the decision m̂(k), the error circuit 312 will still have bandwidth and/or offset mismatch compared to the circuit used to generate the decision m̂(k) due to the tolerance of the manufacturing process. This mismatch will be called "random" mismatch herein, and it can result in sub-optimal equalizer performance because a separate (mismatched) offline error circuit branch 312 is being used to compute the error value used to update the taps, rather than the actual online circuit branch (with slicer 210) that is used to generate the decision. This random mismatch causes the taps to possibly not be updated to their optimum value.

Figure 5:
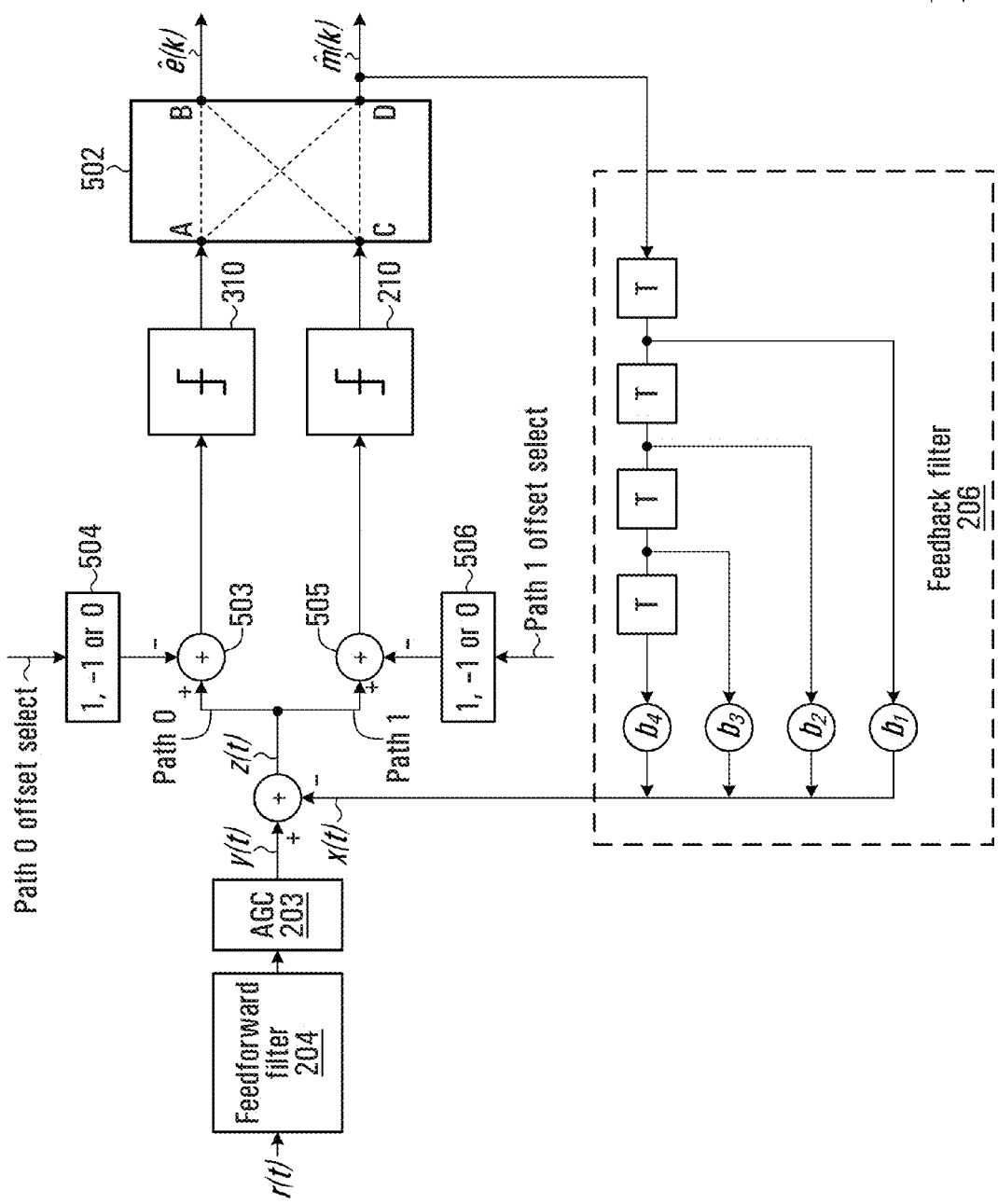

To help mitigate this drawback, another embodiment of an adaptive DFE is illustrated in FIG. 5, in which the same physical circuit is used for both detection and error signal generation. Specifically, over time, the circuit branch (path) used to generate the decision value, and the circuit branch (path) taken offline to generate the offline error value switches, such that the taps are being updated both in instances when Path 0 in FIG. 5 is used to generate the decision and in instances when Path 1 is used to generate the decision. As a result, tap adaptation is based on the characteristics of both branches and therefore incorporates any random mismatch between the two branches.

With reference to FIG. 5, a DFE is illustrated having the optional feedforward filter 204 and the AGC 203. The 4-tap feedback filter 206 is also included. Two circuit branches are included: Path 0 and Path 1, each to receive the same signal z(t). The Path 0 branch includes an adjustor 503 that adjusts signal z(t) by an offset value 504. The offset value 504 is selected as either 1, −1, or 0 by a Path 0 Offset Select. A slicer 310 is downstream and slices the adjusted signal. Similarly, the Path 1 branch includes adjustor 505 to adjust the signal z(t) by an offset value 506 that is also selected as either 1, −1, or 0 by a Path 1 Offset Select. A slicer 210 is downstream and slices the adjusted signal. A 4-way switch 502 is positioned downstream of slicers 210 and 310. When the switch 502 is in a first position, A-B are electrically connected and C-D are electrically connected, such that the output of Path 0 is ê(k) and the output of Path 1 is m̂(k). When the switch 502 is in a second position, A-D are electrically connected and C-B are electrically connected, such that the output of Path 0 is m̂(k) and the output of Path 1 is ê(k).

During operation, when Path 0 is selected as the offline error computation path, the Path 0 Offset Select selects the offset 504 as either "1" or "−1", and the Path 1 Offset Select selects the offset 506 as "0". When Path 1 is selected as the offline error computation path, the Path 1 Offset Select selects the offset as either "1" or "−1", and the Path 0 Offset Select selects the offset 504 as "0". Over time, the following four possible selections are repeated:

TABLE 1

| Path 0 Offset Select 504 | Path 1 Offset Select 506 | 4-way Switch Path Select | Error value used to update taps? |
|---|---|---|---|
| 1 | 0 | AB & CD connected (Path0 is the offline path and Path 1 is the data path) | Only when m̂(k) = 1 |
| −1 | 0 | AB & CD connected (Path 0 is the offline path and Path 1 is the data path) | Only when m̂(k) = −1 |
| 0 | 1 | AD & CB connected (Path 1 is the offline path and Path 0 is the data path) | Only when m̂(k) = 1 |
| 0 | −1 | AD & CB connected (Path 1 is the offline path and Path 0 is the data path) | Only when m̂(k) = −1 |

The four options outlined in Table 1 are cycled through during operation of the adaptive DFE, with ê(k) being used to update the taps $b_1$, $b_2$, $b_3$, and $b_4$ only when the selected offset for the error path matches the decision m̂(k). Comparison circuitry (not illustrated) is used to determine whether the selected offset for the error path matches the decision m̂(k). An example of suitable comparison circuitry is a comparator, which outputs one value if the selected offset for the error path equals the decision m̂(k) (indicating that the error value is not erroneous), and which outputs another value if the selected offset for the error path does not equal the decision m̂(k) (indicating that the error value is erroneous).

The rate at which the selections are cycled through is implementation specific. However, as one example, the selection may change every 20,000 symbols.

The circuit of FIG. 5 has a drawback compared to FIG. 4 in that a 4-way switch 502 is used along with logic (not illustrated) for cycling between the four possible selections in Table 1. Also, the taps $b_1$, $b_2$, $b_3$, and $b_4$ may not be updated as often, but (as mentioned above) this is usually not a problem as the taps $b_1$, $b_2$, $b_3$, and $b_4$ will usually only drift from their optimum value relatively slowly and therefore do not need to be constantly updated. However, the circuit of FIG. 5 has a benefit in that the same physical circuit is used for both detection and error signal generation. Over time, the path used to generate the decision and the path used to generate the error value switch, such that the taps are being updated both in instances when Path 0 is used to generate the decision and in instances when Path 1 is used to generate the decision, such that tap adaptation is based on the characteristics of both paths and therefore reflects random mismatch between the two paths.

The embodiments illustrated above assume that the output x(t) of the feedback filter 206 can be computed without too much lag so that x(t) contributes the correct value to produce equalized output z(t). However, this might not be the case, such that a "look-ahead" implementation may be used in which parallel equalized solutions are generated with the correct one selected based on the value of one or more previous decisions. This is explained below.

Please return to FIG. 4 for ease of explanation. With reference to this figure, the output of the feedback filter 206 x(t) is computed as follows:

$$x(t)=b_1\hat{m}(k-T)+b_2\hat{m}(k-2T)+b_3\hat{m}(k-3T)+b_4\hat{m}(k-4T).$$

As discussed above, there is a delay $D_s$ associated with the time required for the output of the slicer 210 to settle. Then, the decision m̂(k) is to be multiplied by tap $b_1$ so that it can be used as $b_1\hat{m}(k-T)$ in the next symbol period T and summed with the other terms in x(t) to produce x(t). If the time that elapses between (i) the start of a symbol period and (ii) the point when x(t) has been updated based on that symbol period, is greater than (or close to) the duration of a symbol period, then timing constraint problems can occur, as x(t) will lag too much, therefore resulting in an incorrect equalized output z(t). This timing constraint is due to the lag in computing the first few terms of x(t) (e.g. $b_1\hat{m}(k-T)$ and $b_2\hat{m}(k-2T)$). There is usually no critical timing issue with the portion of x(t) that depends on decisions several symbols back in time (e.g. $b_4\hat{m}(k-4T)$), as the lag of x(t) is usually not as great as this many symbol durations in the past.

To address this timing constraint, a look-ahead implementation can be used in which the first tap value (or first few tap values) of the feedback filter 206 are pre-computed in advance, with selection circuitry (such as a multiplexer) used to choose the correct pre-computed contribution once the actual previous decision value is available.

Figure 6:
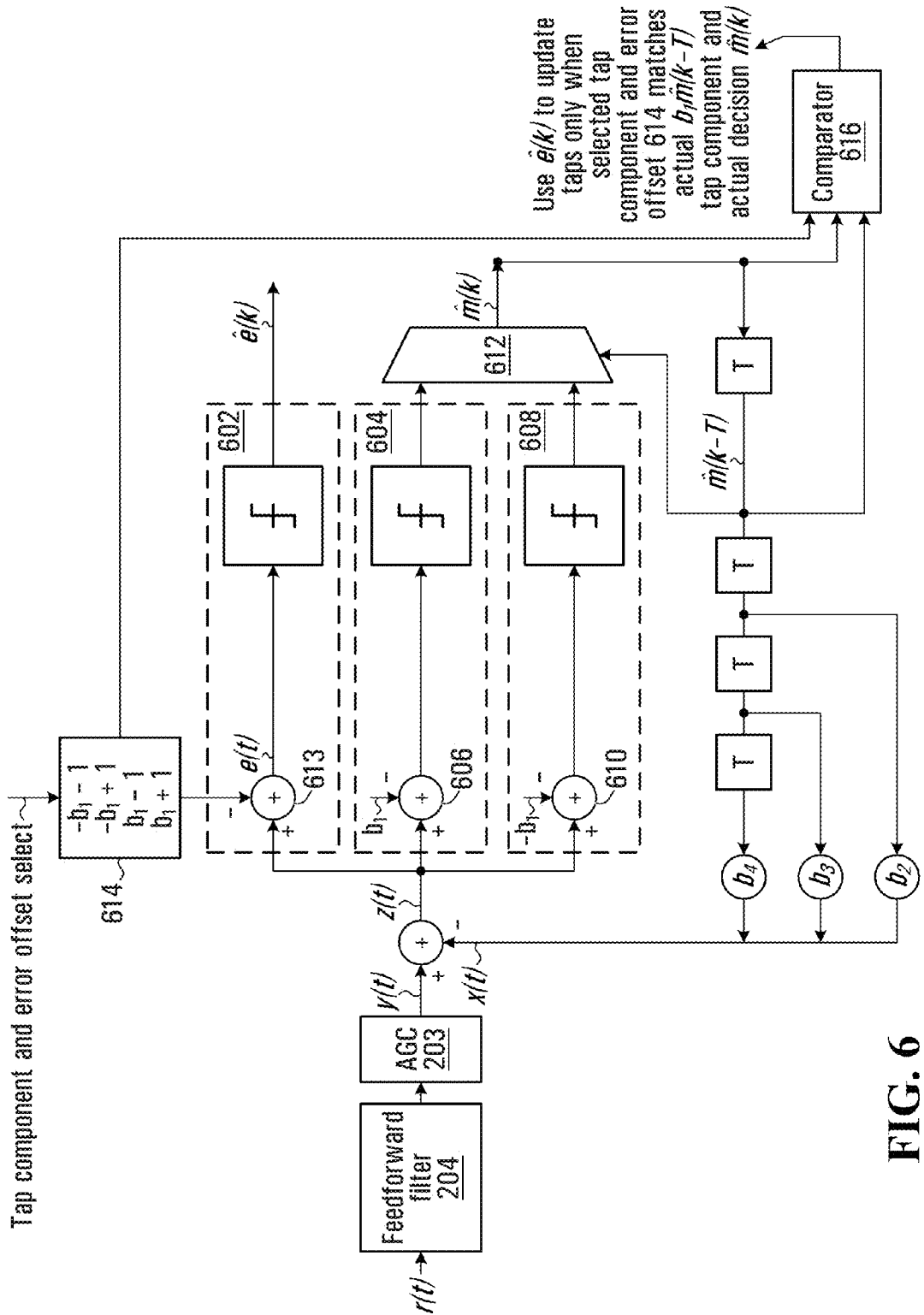

FIG. 6 illustrates the adaptive DFE of FIG. 4 modified so that the first tap $b_1$ is replaced with a look-ahead structure. There are now three paths in the adaptive DFE:

(1) an offline path 602 to compute the error value;

(2) a first data path 604 in which it is assumed in advance that the previous decision is 1, such that the $b_1\hat{m}(k-T)$ component of x(t) is $b_1\hat{m}(k-T)=1b_1=b_1$, which is the offset subtracted from z(t) at adjustor 606; and (3) a second data path 608 in which it is assumed in advance that the previous decision is −1, such that the $b_1\hat{m}(k-T)$ component of x(t) is $b_1\hat{m}(k-T)=-1b_1=-b_1$, which is the offset subtracted from z(t) at adjustor 610.

A multiplexer 612 is included to select between the output of the two data paths 604 and 608. The selection is made based on the value of the actual previous decision value $\hat{m}(k-T)$.

The look-ahead implementation illustrated in FIG. 6 relaxes the timing constraint of the feedback filter, since the $b_1\hat{m}(k-T)$ component of the feedback filter is computed in advance for both possible values of $b_1\hat{m}(k-T)$ ($-b_1$ or $b_1$), with the correct one simply being selected once $\hat{m}(k-T)$ is available.

The offline path 602 is modified compared to FIG. 4 in order to incorporate the $b_1\hat{m}(k-T)$ look ahead. Specifically, instead of waiting for the decision $\hat{m}(k)$ and the $b_1\hat{m}(k-T)$ component of the feedback filter, a selected tap component and error offset value 614 is subtracted from the equalized input z(t) at adjustor 613. The selected tap component and error offset value 614 can be one of the four possible combinations:

$-b_1-1$ (which assumes in advance that $b_1\hat{m}(k-T)=-b_1$ and $\hat{m}(k)=-1$), $-b+1$ (which assumes in advance that $b_1\hat{m}(k-T)=-b_1$ and $\hat{m}(k)=1$), $b_1-1$ (which assumes in advance that $b_1\hat{m}(k-T)=b_1$ and $\hat{m}(k)=-1$), and $b_1+1$ (which assumes in advance that $b_1\hat{m}(k-T)=b_1$ and $\hat{m}(k)=1$).

The sliced error value $\hat{e}(k)$ generated by the error path 602 is erroneous unless it turns out that the $b_1\hat{m}(k-T)$ component and error offset value selected in advance (offset value 614) respectively matches the actual $b_1\hat{m}(k-T)$ component and actual output decision $\hat{m}(k)$. Such a comparison is done via comparison circuitry, which in this embodiment is a comparator 616. When these values do match, the sliced error value $\hat{e}(k)$ is used to update the taps.

For completeness, operation of the comparison circuitry (implemented via comparator 616) is as follows: the $b_1\hat{m}(k-T)$ component of the offset 614 is compared to see if it is equal to the actual $b_1\hat{m}(k-T)$ component. This may be implemented by simply comparing the two values to see if they are equal, and if so outputting a first value indicating that there is a match. The error offset value selected in advance (offset value 614) is also compared to the actual output decision $\hat{m}(k)$ to see if they are the equal, and if so a second value is output indicating that there is a match. If both conditions are satisfied (i.e. both the first and second values indicate that there is a match), then a third value is output indicating that the condition is satisfied and the error value is not erroneous. Otherwise, the third value indicates that the condition is not satisfied and the error value is erroneous. Thus, although comparator 616 is shown for simplicity, it might actually be implemented using two 2-input comparators (one for generating the first value and the other for generating the second value) followed by an AND gate that has as its input the first value and the second value, and produces the third value as its output.

The selected offset value 614 can be periodically cycled between the four possible values over time (i.e. between $-b_1-1$, $-b+1$, $b_1-1$, and $b_1+1$).

In the embodiment shown in FIG. 6, the offline error path 602 used to generate $\hat{e}(k)$ may still have bandwidth and/or offset mismatch compared to the data paths (604 and 608) used to generate the decision $\hat{m}(k)$. As explained earlier, this is due to the tolerance of the manufacturing process, and this mismatch will be called "random" mismatch. Such a mismatch may result in sub-optimal equalizer performance because a separate (mismatched) offline path 602 is being used to generate the error value for the tap updates, rather than the actual data paths 604 and 608 used to generate the decision.

Figure 7:
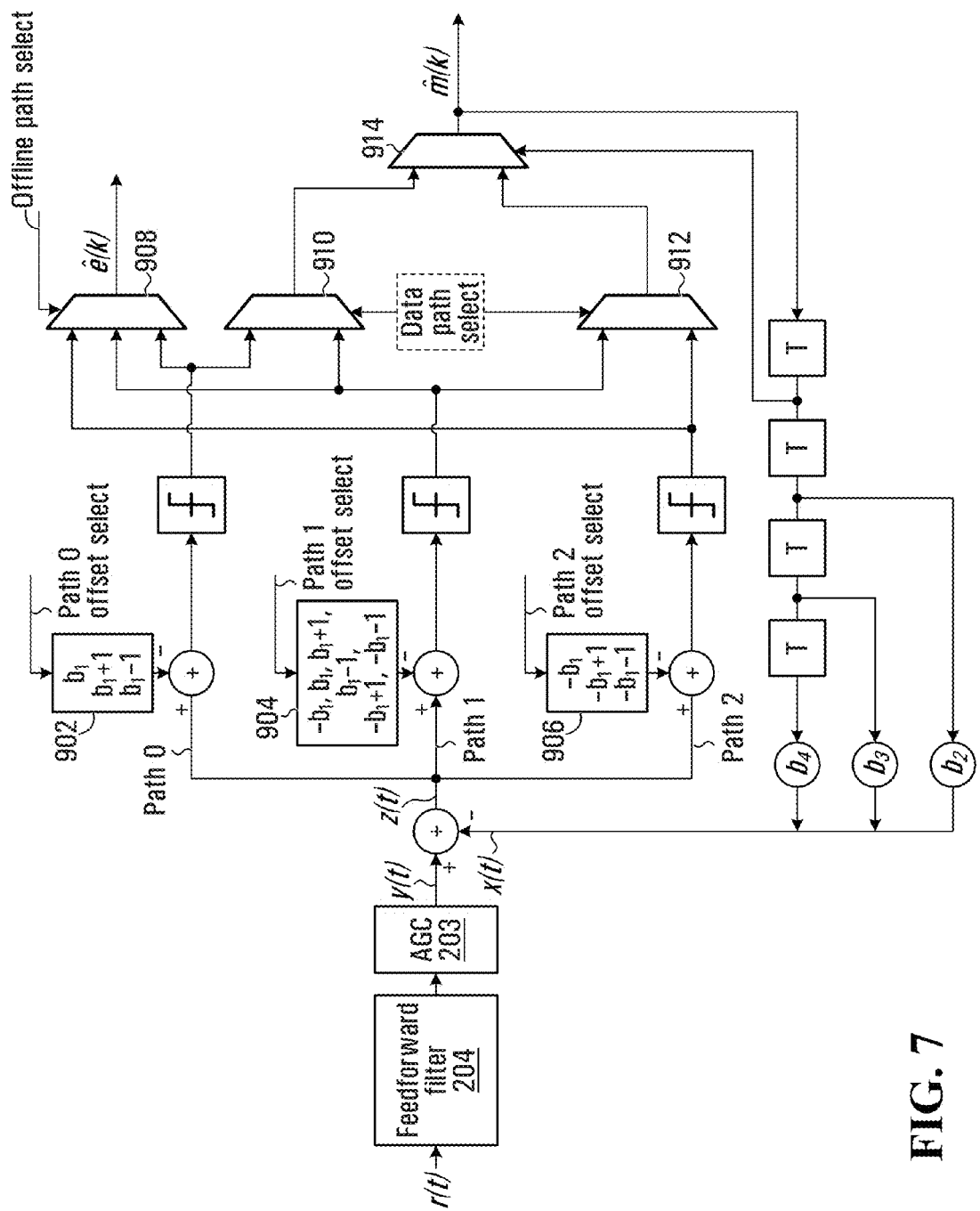

To address this drawback, FIG. 7 illustrates an embodiment of an adaptive DFE in which the first tap $b_1$ is replaced with a look-ahead structure, but in which the same physical circuit is used for both detection and offline error signal generation, with each branch being taken offline in a round-robin fashion.

The adaptive DFE of FIG. 7 includes the feedforward filter 204 and the AGC 203. The 4-tap feedback filter has taps $b_2$, $b_3$, and $b_4$ in the feedback path, but the first tap $b_1$ is integrated into the offsets of the circuit branches, as discussed below. The signal z(t) is branched into three branches respectively labelled "Path 0", "Path 1", and "Path 2". Each path has a respective adjustor to adjust the signal z(t) by a selected offset, followed by a slicer. The output of each of the three paths is sent to a multiplexer 908 that selects the offline path. The output of Path 0 and Path 1 is also sent to a multiplexer 910, and the output of Path 1 and Path 2 is also sent to a multiplexer 912. The output of multiplexers 910 and 912 are sent to a multiplexer 914, which outputs the decision value $\hat{m}(k)$.

During operation, the paths used to generate the decision and the offline path used to generate the error value switches, such that the taps are being updated in instances when illustrated Path 0 is used to generate the decision, in instances when illustrated Path 1 is used to generate the decision, and in instances when illustrated Path 2 is used to generate the decision.

More specifically, Path 0 includes a Path 0 Offset Select that allows for the selection of 3 possible offset values 902:

(1) $b_1$, in the situation in which Path 0 is selected as a data path, and it is assumed in advance that the previous decision $\hat{m}(k-T)$ is 1, such that $b_1\hat{m}(k-T)=b_1$.

(2) $b_1+1$, in the situation in which Path 0 is selected as the offline error path, and it is assumed in advance that the decision $\hat{m}(k)=1$, and it is assumed in advance that the previous decision $\hat{m}(k-T)$ is 1 (such that $b_1\hat{m}(k-T)=b_1$).

(3) $b_1-1$, in the situation in which Path 0 is selected as the offline error path, and it is assumed in advance that the decision $\hat{m}(k)=-1$, and it is assumed in advance that the previous decision $\hat{m}(k-T)$ is 1 (such that $b_1\hat{m}(k-T)=b_1$).

In this embodiment, when Path 0 is used as the offline error path, it is never assumed that the previous decision $\hat{m}(k-T)$ is $-1$ (such that $b_1\hat{m}(k-T)=-b_1$). In these instances, when it turns out that the previous decision $\hat{m}(k-T)$ is $-1$, the error value $\hat{e}(k)$ is erroneous and is not used to update the taps. As discussed below, the error value $\hat{e}(k)$ is also erroneous and is not used to update the taps when the actual decision $\hat{m}(k)$ is different from the polarity of the $+/-1$ added offset.

It will be appreciated that the adaptive DFE in FIG. 7 could be modified to include additional Path 0 Offset 902 values of $-b_1+1$ and $-b_1-1$, if desired. This would result in more options to cycle through and may require more complex selection logic. The omission of $-b_1+1$ and $-b_1-1$ can be thought of as a simplification, as they are not necessary since in this implementation Path 0 will never need to use $-b_1$ as an offset when it acts as a data path.

Path 1 includes a Path 1 Offset Select that allows for the selection of 6 possible offset values 904:

(1) $b_1$, in the situation in which Path 1 is selected as a data path, and it is assumed in advance that the previous decision $\hat{m}(k-T)$ is 1, such that $b_1\hat{m}(k-T)=b_1$.
(2) $-b_1$, in the situation in which Path 1 is selected as a data path, and it is assumed in advance that the previous decision $\hat{m}(k-T)$ is $-1$, such that $b_1\hat{m}(k-T)=-b_1$.
(3) $b_1+1$, in the situation in which Path 1 is selected as the offline error path, and it is assumed in advance that the decision $\hat{m}(k)=1$, and it is assumed in advance that the previous decision $\hat{m}(k-T)$ is 1 (such that $b_1\hat{m}(k-T)=b_1$).
(4) $b_1-1$, in the situation in which Path 1 is selected as the offline error path, and it is assumed in advance that the decision $\hat{m}(k)=-1$, and it is assumed in advance that the previous decision $\hat{m}(k-T)$ is 1 (such that $b_1\hat{m}(k-T)=b_1$).
(5) $-b_1+1$, in the situation in which Path 1 is selected as the offline error path, and it is assumed in advance that the decision $\hat{m}(k)=1$, and it is assumed in advance that the previous decision $\hat{m}(k-T)$ is $-1$ (such that $b_1\hat{m}(k-T)=-b_1$).
(6) $-b_1-1$, in the situation in which Path 1 is selected as the offline error path, and it is assumed in advance that the decision $\hat{m}(k)=-1$, and it is assumed in advance that the previous decision $\hat{m}(k-T)$ is $-1$ (such that $b_1\hat{m}(k-T)=-b_1$).

The situations in which the error value $\hat{e}(k)$ is erroneous and is not used are discussed below.

Path 2 includes a Path 2 Offset Select that allows for the selection of 3 possible offset values 906:

(1) $-b_1$, in the situation in which Path 2 is selected as a data path, and it is assumed in advance that the previous decision $\hat{m}(k-T)$ is $-1$, such that $b_1\hat{m}(k-T)=-b_1$.
(2) $-b_1+1$, in the situation in which Path 2 is selected as the offline error path, and it is assumed in advance that the decision $\hat{m}(k)=1$, and it is assumed in advance that the previous decision $\hat{m}(k-T)$ is $-1$ (such that $b_1\hat{m}(k-T)=-b_1$).
(3) $-b_1-1$, in the situation in which Path 2 is selected as the offline error path, and it is assumed in advance that the decision $\hat{m}(k)=-1$, and it is assumed in advance that the previous decision $\hat{m}(k-T)$ is $-1$ (such that $b_1\hat{m}(k-T)=-b_1$).

When Path 2 is used as the offline error path, it is never assumed that the previous decision $\hat{m}(k-T)$ is 1 (such that $b_1\hat{m}(k-T)=b_1$). In these instances, when it turns out that the previous decision $\hat{m}(k-T)$ is 1, the error value $\hat{e}(k)$ is erroneous and is not used. As discussed below, the error value $\hat{e}(k)$ is also erroneous and is not used when the actual decision $\hat{m}(k)$ is different from the polarity of the $+/-1$ added offset.

It will be appreciated that the adaptive DFE in FIG. 7 could be modified to include additional Path 2 Offset 906 values of $b_1+1$ and $b_1-1$, if desired. This would result in more options to cycle through and may require more complex selection logic. The omission of $b_1+1$ and $b_1-1$ can be thought of as a simplification, as they are not necessary since in this implementation Path 2 will never need to use $b_1$ as an offset when it acts as a data path.

The output of each of Paths 0, 1, and 2 is fed to the multiplexer 908, which selects which one of the three paths will be used as the offline path to output sliced error value $\hat{e}(k)$, which is an offline value. The multiplexers 910 and 912 are data path select multiplexers that select the two remaining paths as the data paths.

When Path 0 is selected as the offline error path, then the data path select multiplexers 910 and 912 are configured to select Paths 1 and 2 as the data paths (specifically Path 1 being the data path in which it is assumed in advance that the previous decision $\hat{m}(k-T)$ is 1 (such that $b_1\hat{m}(k-T)=b_1$), and Path 2 being the data path in which it is assumed in advance that the previous decision $\hat{m}(k-T)$ is $-1$ (such that $b_1\hat{m}(k-T)=-b_1$)).

When Path 1 is selected as the offline error path, then the data path select multiplexers 910 and 912 are configured to select Paths 0 and 2 as the data paths (specifically Path 0 being the data path in which it is assumed in advance that the previous decision $\hat{m}(k-T)$ is 1 (such that $b_1\hat{m}(k-T)=b_1$), and Path 2 being the data path in which it is assumed in advance that the previous decision $\hat{m}(k-T)$ is $-1$ (such that $b_1\hat{m}(k-T)=-b_1$)).

When Path 2 is selected as the offline error path, then the data path select multiplexers 910 and 912 are configured to select Paths 0 and 1 as the data paths (specifically Path 0 being the data path in which it is assumed in advance that the previous decision $\hat{m}(k-T)$ is 1 (such that $b_1\hat{m}(k-T)=b_1$), and Path 1 being the data path in which it is assumed in advance that the previous decision $\hat{m}(k-T)$ is $-1$ (such that $b_1\hat{m}(k-T)=-b_1$)).

The outputs of the data path select multiplexers 910 and 912 are sent to multiplexer 914, which chooses the correct decision $\hat{m}(k)$ based on the actual previous decision $\hat{m}(k-T)$, once the actual previous decision $\hat{m}(k-T)$ is available.

In the adaptive DFE of FIG. 7, the eight possible configurations that are cycled through are shown in the following table:

TABLE 2

| Selection | Selected Offline Error Path 908 | Path 0 Offset Value 902 | Path 1 Offset Value 904 | Path 2 Offset Value 906 | $\hat{e}(k)$ used to update taps? |
|---|---|---|---|---|---|
| 1 | Path 0 | $b_1 + 1$ | $b_1$ | $-b_1$ | Only when it is determined that $\hat{m}(k - T) = 1$ and $\hat{m}(k) = 1$ |
| 2 | Path 0 | $b_1 - 1$ | $b_1$ | $-b_1$ | Only when it is determined that $\hat{m}(k - T) = 1$ and $\hat{m}(k) = -1$ |
| 3 | Path 1 | $b_1$ | $-b_1 + 1$ | $-b_1$ | Only when it is determined that $\hat{m}(k - T) = -1$ and $\hat{m}(k) = 1$ |
| 4 | Path 1 | $b_1$ | $-b_1 - 1$ | $-b_1$ | Only when it is determined that $\hat{m}(k - T) = -1$ and $\hat{m}(k) = -1$ |
| 5 | Path 2 | $b_1$ | $-b_1$ | $-b_1 + 1$ | Only when it is determined that $\hat{m}(k - T) = -1$ and $\hat{m}(k) = 1$ |

TABLE 2-continued

| Selection | Selected Offline Error Path 908 | Path 0 Offset Value 902 | Path 1 Offset Value 904 | Path 2 Offset Value 906 | ê(k) used to update taps? |
|---|---|---|---|---|---|
| 6 | Path 2 | $b_1$ | $-b_1$ | $-b_1 - 1$ | Only when it is determined that $\hat{m}(k - T) = -1$ and $\hat{m}(k) = -1$ |
| 7 | Path 1 | $b_1$ | $b_1 + 1$ | $-b_1$ | Only when it is determined that $\hat{m}(k - T) = 1$ and $\hat{m}(k) = 1$ |
| 8 | Path 1 | $b_1$ | $b_1 - 1$ | $-b_1$ | Only when it is determined that $\hat{m}(k - T) = 1$ and $\hat{m}(k) = -1$ |

The eight options outlined in Table 2 are cycled through during operation of the adaptive DFE, with ê(k) being used to update the taps only in the instances shown in the right-most column in Table 2. Otherwise, the error value ê(k) is erroneous and is ignored. Comparison circuitry (not shown) is used to perform the comparison in the right-most column in Table 2 to determine whether the error value is erroneous. An explanation of how comparison circuitry may be implemented is provided above.

The rate at which the selections are cycled through is implementation specific. As one example, the selection may change every 20,000 symbols.

Selections 1 to 8 in Table 2 may be cycled through in any desired order. However, a benefit may be achieved if the order chosen is such that:
(1) immediately before the offline path is about to be switched back to being a data path, the polarity of the tap of the offline offset value is the same as the polarity of the tap of the data path about to be taken offline, and
(2) when the offline path switches, the polarity of the taps on the new data paths are not changed from their previous polarities.

By choosing this order, the circuit may operate in a more glitchless fashion. Note that by cycling through the eight options outlined in Table 2 in the exact order they are shown in the table (i.e. begin at selection 1, and then move down the table in sequential order, wrapping back up to selection 1 after selection 8 and repeating), then (1) and (2) above are satisfied. For example, selection 2 is immediately before Path 0 is about to be switched back to a data path. The tap polarity of Path 0 Offset Value 902 is positive ($+b_1$). This is the same as the tap polarity of Path 1 (which is about to be taken offline in selection 3). When moving from selection 2 to selection 3, the polarity of the taps on the new data paths (Path 0 and Path 2 in selection 3) are not changed relative to selection 2. The same properties (1) and (2) above hold for the other transitions in the order outlined in Table 2.

When it is the case that the sliced error value ê(k) is not erroneous, then it is used to update the taps. In particular, in this embodiment, whenever the sliced error value ê(k) is not erroneous, then taps $b_2$, $b_3$, and $b_4$ are updated, along with only the tap offset value $b_1$ of the error path. For example, assume that Path 0 is the selected error path, and therefore the Path 0 offset 902 is either $b_1 + 1$ or $b_1 - 1$. Then only the Path 0 tap offset value $b_1$ (along with taps $b_2$, $b_3$, and $b_4$) are updated using ê(k) (when ê(k) is not erroneous). The offset values for Path 1 and Path 2 (i.e. the $b_1$ value used in selected value 904 and the $b_1$ value used in selected value 906) are not updated. In this way, whenever the error value ê(k) is not erroneous, the taps $b_2$, $b_3$, and $b_4$ are updated, and the $b_1$ tap offset component is updated only for the offline error path (not for the data paths), which results in the $b_1$ tap offset component being adapted independently for each path, resulting in a $b_1$ tap offset component optimal for the particular path (i.e. it will account for the specific characteristic of the particular path). Note that for Path 1, it is preferred that both the $b_1$ tap offset component and $-b_1$ tap offset component be adapted independently, although this is not necessary.

If the SS-LMS method is used to update the taps, then one such way of updating the taps is as follows:
(1) For taps $b_2$, $b_3$, and $b_4$: $b_i = b_i + \mu \hat{e}(k)\hat{m}(k-iT)$.
(2) When Path 0 is selected as the error path:
 (a) for the $b_1$ value used in the offset of Path 0: $b_1 = b_1 + \mu \hat{e}(k)\hat{m}(k-T)$.
 (b) no update to the offsets used in Paths 1 and 2.
(3) When Path 2 is selected as the error path:
 (a) for the $-b_1$ value used in the offset of Path 2: $-b_1 = -b_1 - \mu \hat{e}(k)\hat{m}(k-T)$.
 (b) no update to the offsets used in Paths 0 and 1.
(4) When Path 1 is selected as the error path and the Path 1 offset 904 includes the value $b_1$:
 (a) for the $b_1$ value used in the offsets of Path 1: $b_1 = b_1 + \mu \hat{e}(k)\hat{m}(k-T)$.
 (b) no update to the offsets used in Paths 0 and 2.
(5) When Path 1 is selected as the error path and the Path 1 offset 904 includes the value $-b_1$:
 (a) for the $-b_1$ value used in the offsets of Path 1: $-b_1 = -b_1 - \mu \hat{e}(k) \hat{m}(k-T)$.
 (b) no update to the offsets used in Paths 0 and 2.

Of course, there is only a tap update if the error value is not erroneous. Otherwise, there is no tap update.

A possible drawback of the adaptive DFE of FIG. 7 is that it uses additional multiplexers 908, 910, and 912, along with associated logic for cycling through the possible offsets and offline/data path selections in Table 2. Also, the taps may not be updated as often since the error value ê(k) will be erroneous and will have to be ignored except for in the conditions outlined in the right-most column in Table 2. However, this is usually not a problem since (as mentioned earlier) the taps will usually only drift from their optimum value relatively slowly and therefore do not need to be updated quickly. However, the circuit of FIG. 7 has a potential benefit in that the same physical circuit is used for both detection and error signal generation. Thus, over time, the path used to generate the decision and the error value switches, such that the taps/offset(s) are being updated in instances when the selected decision is generated by Path 0, in instances when the selected decision is generated by Path 1, and in instances when the selected decision is generated by Path 2. The adaptation of taps $b_2$, $b_3$, and $b_4$ are updated based on the characteristics of all paths and therefore reflects any random mismatch between the paths. The $b_1$ tap offset component is updated independently for each path, resulting in a $b_1$ tap offset component optimal for the particular path.

In an alternative embodiment, the value $b_1$ used in each offset 902, 904, and 906 could instead be updated each time the error value is not erroneous (rather than just updating the $b_1$ component for the offline path). However, this would not result in the benefit of having a $b_1$ tap offset component independently customized for each particular path.

Figure 8:
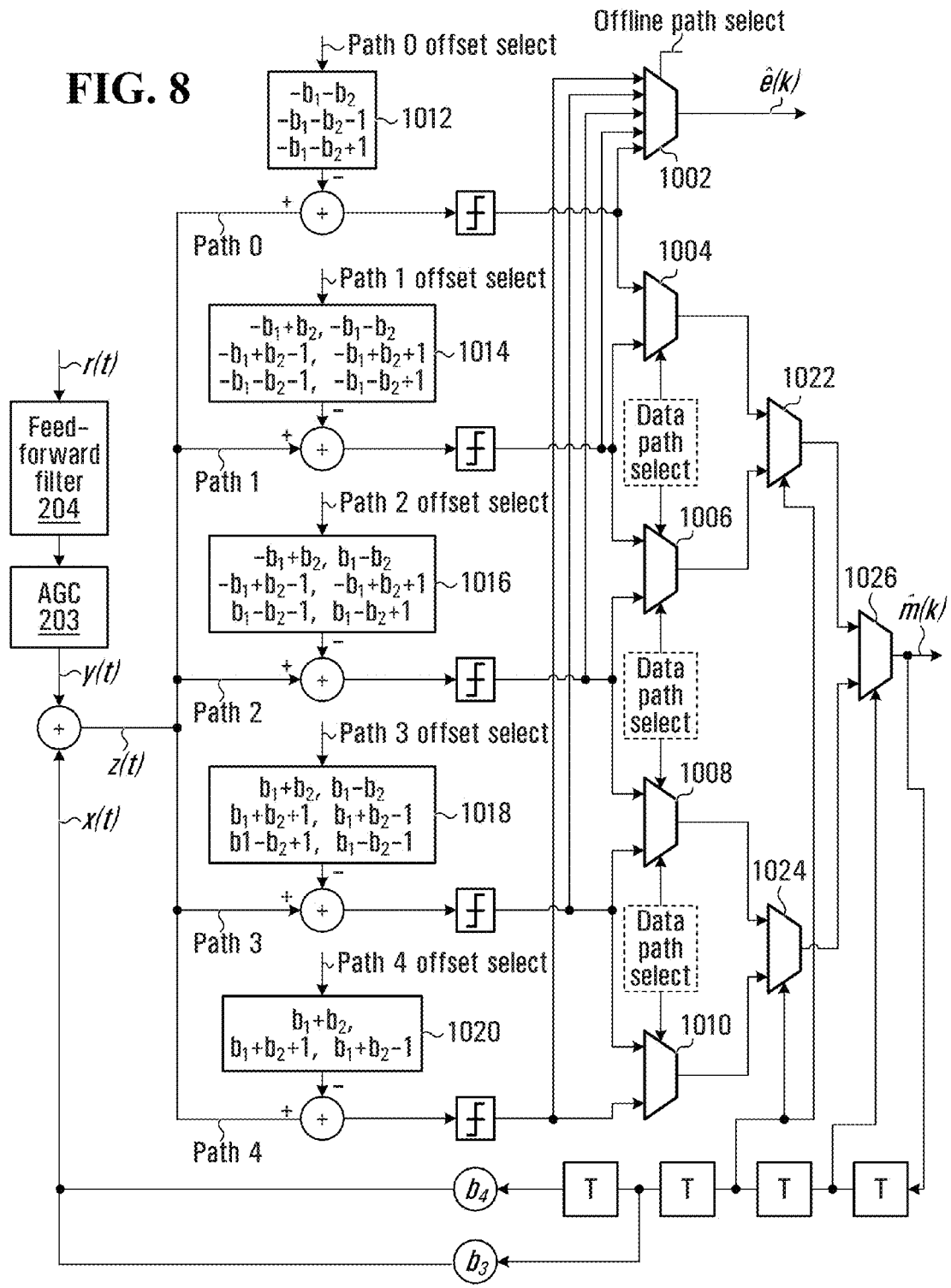

FIG. 8 illustrates the DFE of FIG. 7, but instead modified to have two look-ahead taps. In this DFE, there are 5 branches (Path 0, Path 1, Path 2, Path 3, and Path 4), of which one is selected as the offline error path by offline path select multiplexer 1002, and the other four paths are selected as the data paths by data path select multiplexers 1004, 1006, 1008, and 1010. The four selected data paths are configured as follows:

(1) One data path generates the decision assuming in advance that the previous decision $\hat{m}(k-T)=1$ and the decision two symbol periods ago is $\hat{m}(k-2T)=1$, such that the component of the feedback filter representing terms $b_1\hat{m}(k-T)+b_2\hat{m}(k-2T)$ is $b_1\hat{m}(k-T)+b_2\hat{m}(k-2T)=b_1+b_2$. This offset is added in the path prior to the slicer.

(2) Another data path generates the decision assuming in advance that the previous decision $\hat{m}(k-T)=1$ and the decision two symbol periods ago is $\hat{m}(k-2T)=-1$, such that the component of the feedback filter representing terms $b_1\hat{m}(k-T)+b_2\hat{m}(k-2T)$ is $b_1\hat{m}(k-T)+b_2\hat{m}(k-2T)=b_1-b_2$. This offset is added in the path prior to the slicer.

(3) Another data path generates the decision assuming in advance that the previous decision $\hat{m}(k-T)=-1$ and the decision two symbol periods ago is $\hat{m}(k-2T)=1$, such that the component of the feedback filter representing terms $b_1\hat{m}(k-T)+b_2\hat{m}(k-2T)$ is $b_1\hat{m}(k-T)+b_2\hat{m}(k-2T)=-b_1+b_2$. This offset is added in the path prior to the slicer.

(4) Another data path generates the decision assuming in advance that the previous decision $\hat{m}(k-T)=-1$ and the decision two symbol periods ago is $\hat{m}(k-2T)=-1$, such that the component of the feedback filter representing terms $b_1\hat{m}(k-T)+b_2\hat{m}(k-2T)$ is $b_1\hat{m}(k-T)+b_2\hat{m}(k-2T)=-b_1-b_2$. This offset is added in the path prior to the slicer.

The four data paths each generate a possible correct decision. The actual correct decision is selected using multiplexers 1022, 1024, and 1026 once the actual values of $\hat{m}(k-T)$ and $\hat{m}(k-2T)$ are available.

Path offset selectors respectively corresponding to offsets 1012, 1014, 1016, 1018, and 1020 each select the appropriate offset for a given selection of offline path (via multiplexer 1002), for a given selection of data paths (via multiplexers 1004, 1006, 1008, and 1010), and for a given selection of possible error offset values (+1 or −1). In particular, sixteen possible configurations are cycled through, as shown in the table in FIG. 9.

The sixteen options outlined in the table of FIG. 9 are cycled through during operation of the adaptive DFE, with $\hat{e}(k)$ being used to update the taps only in the instances shown in the right-most column in the table of FIG. 9. Otherwise, the error value $\hat{e}(k)$ is erroneous and is ignored. Comparison circuitry is used to determine whether the condition in the right-most column in the table of FIG. 9 is satisfied, so as to determine whether or not the error value is erroneous.

The rate at which the selections are cycled through is implementation specific. As one example, the selection may change every 20,000 symbols.

Selections 1 to 16 in the table in FIG. 9 may be cycled through in any desired order. However, a benefit may be achieved if the order chosen is such that:

(1) immediately before the offline path is about to be switched back to being a data path, the polarity of the taps of the offline offset value is the same as the polarity of the taps of the data path about to be taken offline, and (2) when the offline path switches, the polarity of the taps on the new data paths are not changed from their previous polarities.

By choosing this order, the circuit may operate in a more glitchless fashion. Note that by cycling through the sixteen options outlined in the table of FIG. 9 in the exact order they are shown in the table (i.e. begin at selection 1 (the first row of the table), and then move down the table in sequential order, wrapping back up to selection 1 after selection 16 (the last row), and repeating), then (1) and (2) above are satisfied.

When it is the case that the sliced error value $\hat{e}(k)$ is not erroneous, then it is used to update the taps. In particular, in this embodiment, whenever the sliced error value $\hat{e}(k)$ is not erroneous, then taps $b_3$, and $b_4$ are updated, along with only the selected tap offset values $b_1$ and $b_2$ of the offline error path. For example, assume that Path 0 is the selected offline path, and therefore the Path 0 offset 1012 is either $-b_1-b_2-1$ or $-b_1-b_2+1$. Only the $-b_1$ and $-b_2$ values used in offset 1012 (along with taps $b_3$, and $b_4$) are updated using $\hat{e}(k)$ (when $\hat{e}(k)$ is not erroneous). The offsets in Paths 1 to 4 (i.e. the tap component values used in each of selected offset values 1014, 1016, 1018, and 1020) are not updated. In this way, whenever the error value $\hat{e}(k)$ is not erroneous, the taps $b_3$, and $b_4$ are updated, and the $b_1$ and $b_2$ tap offset components are updated only for the selected offline error path (not for the selected data paths), which results in the $b_1$ and $b_2$ values being adapted independently for each path, thereby resulting in $b_1$ and $b_2$ tap offset components optimal for the particular path (i.e. they will account for the specific characteristic of the particular path). It is preferred that for each path each $b_1$ and $b_2$ tap component is adapted independently, although this is not necessary.

If the SS-LMS method of updating the taps is used, then one such way of updating the taps is as follows:

$b_i^{n+1}=b_i^n+\mu\hat{e}(k)\hat{m}(k-iT)$, for taps $b_3$, and $b_4$;

offset$_{-1,-1}^{n+1}$=offset$_{-1,-1}^n+\mu\hat{e}(k)((\hat{m}(k-T)==-1)\&\&(\hat{m}(k-2T)==-1))$, valid for Paths 0 and 1, when the error path being adapted corresponds to $\hat{m}(k-T)=-1$ and $\hat{m}(k-2T)=-1$;

offset$_{+1,-1}^{n+1}$=offset$_{+1,-1}^n+\mu\hat{e}(k)((\hat{m}(k-T)==+1)\&\&(\hat{m}(k-2T)==-1))$, valid for Paths 2 and 3, when the error path being adapted corresponds to $\hat{m}(k-T)=+1$ and $\hat{m}(k-2T)=-1$;

offset$_{-1,+1}^{n+1}$=offset$_{-1,-1}^n+\mu\hat{e}(k)((\hat{m}(k-T)==-1)\&\&(\hat{m}(k-2T)==+1))$, valid for Paths 1 and 2, when the error path being adapted corresponds to $\hat{m}(k-T)=-1$ and $\hat{m}(k-2T)=+1$; and offset$_{+1,+}^{n+1}$=offset$_{-1,-1}^n\mu\hat{e}(k)((\hat{m}(k-T)==+1)\&\&(\hat{m}(k-2T)==+1))$, valid for Paths 3 and 4, when the error path being adapted corresponds to $\hat{m}(k-T)=+1$ and $\hat{m}(k-2T)=+1$. The term offset in the equations above corresponds to a linear combination of $b_1$ and $b_2$ (i.e. offset$_{+1,+1}=b_1+b_2$, offset$_{-1,+1}=-b_1+b_2$, offset$_{+1,-1}=b_1-b_2$, and offset$_{-1,-1}=-b_1-b_2$). In this embodiment, 8 different offset values are adapted independently.

In an alternative embodiment, one could instead update the values $b_1$ and $b_2$ used in each offset 1012, 1014, 1016, 1018, and 1020 each time the error value is not erroneous (rather than just updating the $b_1$ and $b_2$ values of the selected offline error path). However, this would not result in the potential benefit of having a $b_1$ tap offset component and a $b_2$ tap offset component independently customized for each particular path.

This is only one possible method of updating the taps. Other methods may be used. Moreover, as mentioned above, the tap updating method outlined above is only valid when the error value is not erroneous (as defined in the right-most column in the table of FIG. 9). Otherwise, no taps are updated.

It will be appreciated that the adaptive DFE in FIG. 8 could be modified to include additional offset values for each of the paths, which would be cycled through. However, this would require different associated logic and a different implementation of the selection multiplexers. For example, the possible offset values for each path could include a subset of or all of the following (which are all the possible permutations of the $b_1\hat{m}(k-T)+b_2\hat{m}(k-2T)$ component and possible error offset values): $b_1+b_2$, $b_1+b_2+1$, $b_1+b_2-1$, $b_1-b_2$, $b_1-b_2+1$, $b_1-b_2-1$, $-b_1+b_2$, $-b_1+b_2+1$, $-b_1+b_2-1$, $-b_1-b_2$, $-b_1-b_2+1$, $-b_1-b_2-1$. Any subset of this list of offsets can be used as offset values for each of Paths 0 to 4, as long as each path is able to be an offline error path with each of the remaining paths being a data path with an offset respectively corresponding to one of the 4 possible decisions that can be selected once $\hat{m}(k-T)$ and $\hat{m}(k-2T)$ are actually known. This condition is met in the illustrated embodiment, as in each row of the table of FIG. 9, the data paths that are not chosen as the error path each have a respective offset $b_1+b_2$, $b_1-b_2$, $-b_1+b_2$, and $-b_1-b_2$. The available offset values that can specifically be selected in 1012, 1014, 1016, 1018, and 1020 in the FIG. 8 embodiment are only one example, but this illustrated configuration is beneficial in that Path 0 and Path 4 do not include unnecessary additional possible offset values.

Adaptive DFE with M-PAM

The embodiments discussed above assume binary-PAM or NRZ modulation, in which case a single slicer (e.g. slicer 210) can be used as a detector. If a different modulation scheme is used, then an appropriate corresponding detector is used. For example, in an alternative embodiment M-PAM may be used as the modulation scheme, where M is greater or equal to 2. For example, assume M=4, i.e. 4-PAM modulation. A few example embodiments with 4-PAM modulation are discussed below.

Figure 10:
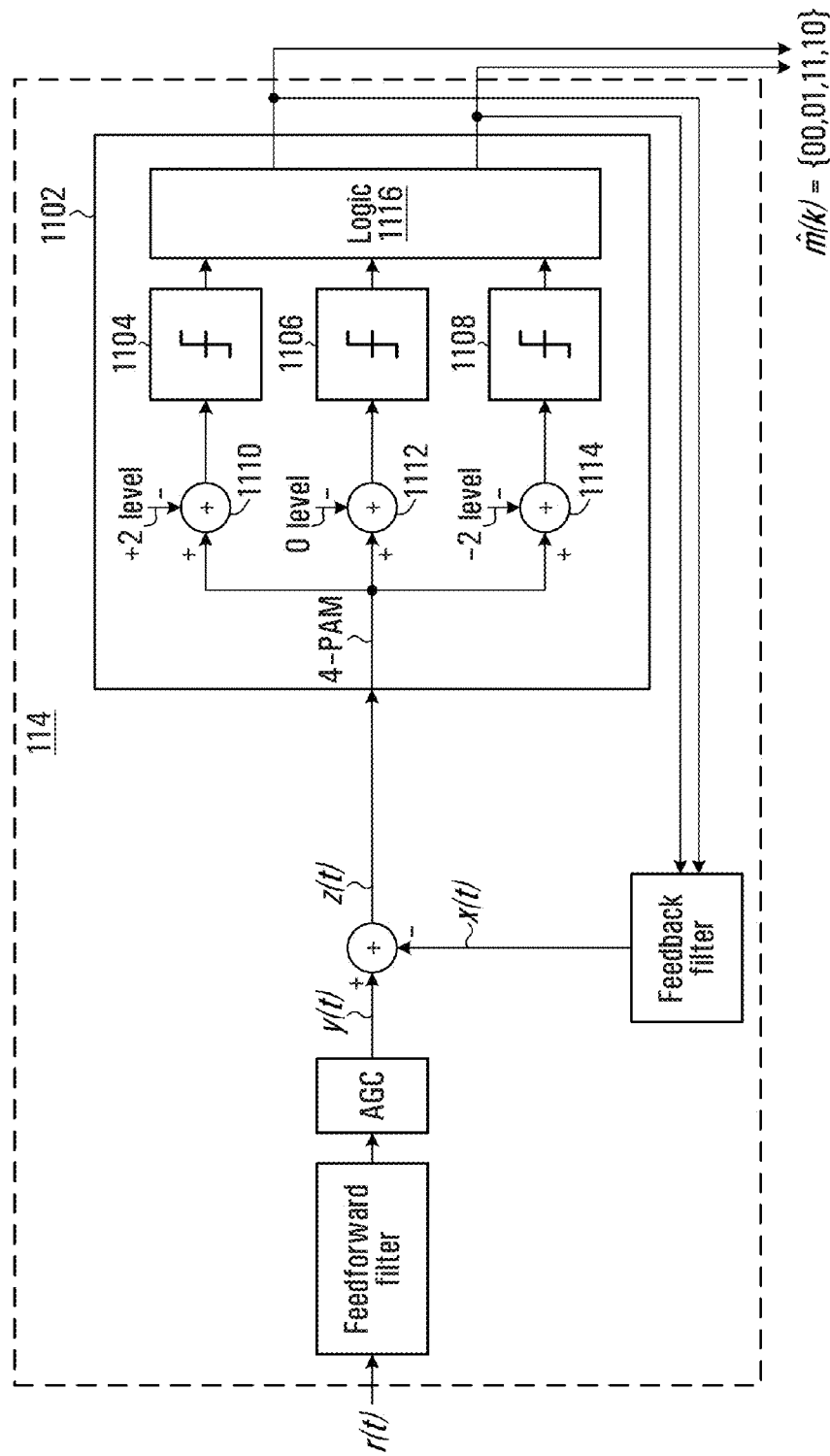
FIG. 10 is an embodiment of an adaptive decision feedback equalizer for 4-PAM.

FIG. 10 is an embodiment of a DFE, like that shown in FIG. 2, but modified for 4-PAM instead. The valid symbols for 4-PAM in this embodiment are {−3, −1, 1, 3}, which respectfully correspond to "00", "01", "11", "10". The decision circuitry of FIG. 10 comprises detector 1102, which includes 3 parallel slicers 1104, 1106, and 1108. The reference level of slicer 1104 is set to "+2" by adjustor 1110, the reference level of slicer 1106 is set to "0" by adjustor 1112, and the reference level of slicer 1108 is set to "−2" by adjustor 1114. Combinatorial logic 1116 converts the decision outputs from the 3 comparators to two bits (either "00", "01", "11", or "10") using a simple look-up table, for example.

Figure 11:
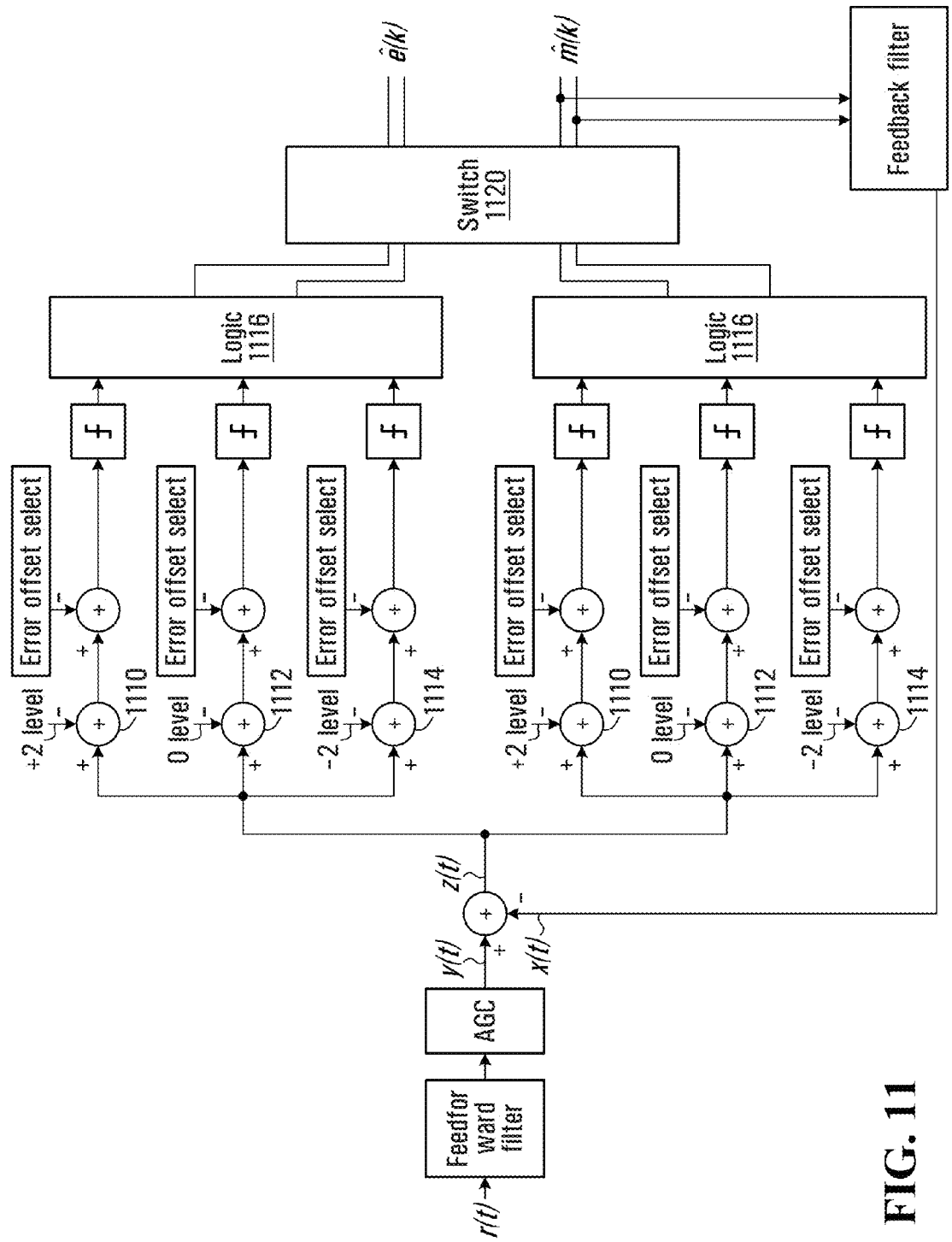
FIGS. 11 and 12 illustrate other example embodiments of adaptive decision feedback equalizers for 4-PAM.

FIG. 11 is an embodiment of an adaptive DFE, like that shown in FIG. 5, but assuming 4-PAM and with the 4-PAM detector discussed above in relation to FIG. 10. FIG. 11 is an example embodiment in which 4-PAM is used and the same physical circuit is used for both detection and error signal generation. This adaptive DFE in FIG. 11 can be considered to have two main branches, an online one which ultimately outputs the decision, and an offline one which ultimately outputs the error. Each main branch has 3 sub-branches. One of the main branches is selected (i.e. taken offline) via switch 1120 to output the error value, and the other main branch is selected via switch 1120 to output the decision value. The main branch taken offline to output the error value changes during operation of the adaptive DFE.

It will be appreciated that the embodiment in FIG. 11 can be generalized for M-PAM (M greater than 4) through further modification in a similar manner. It will also be appreciated that FIG. 11 could be further modified to include one or more "look-ahead" taps.

Figure 12:
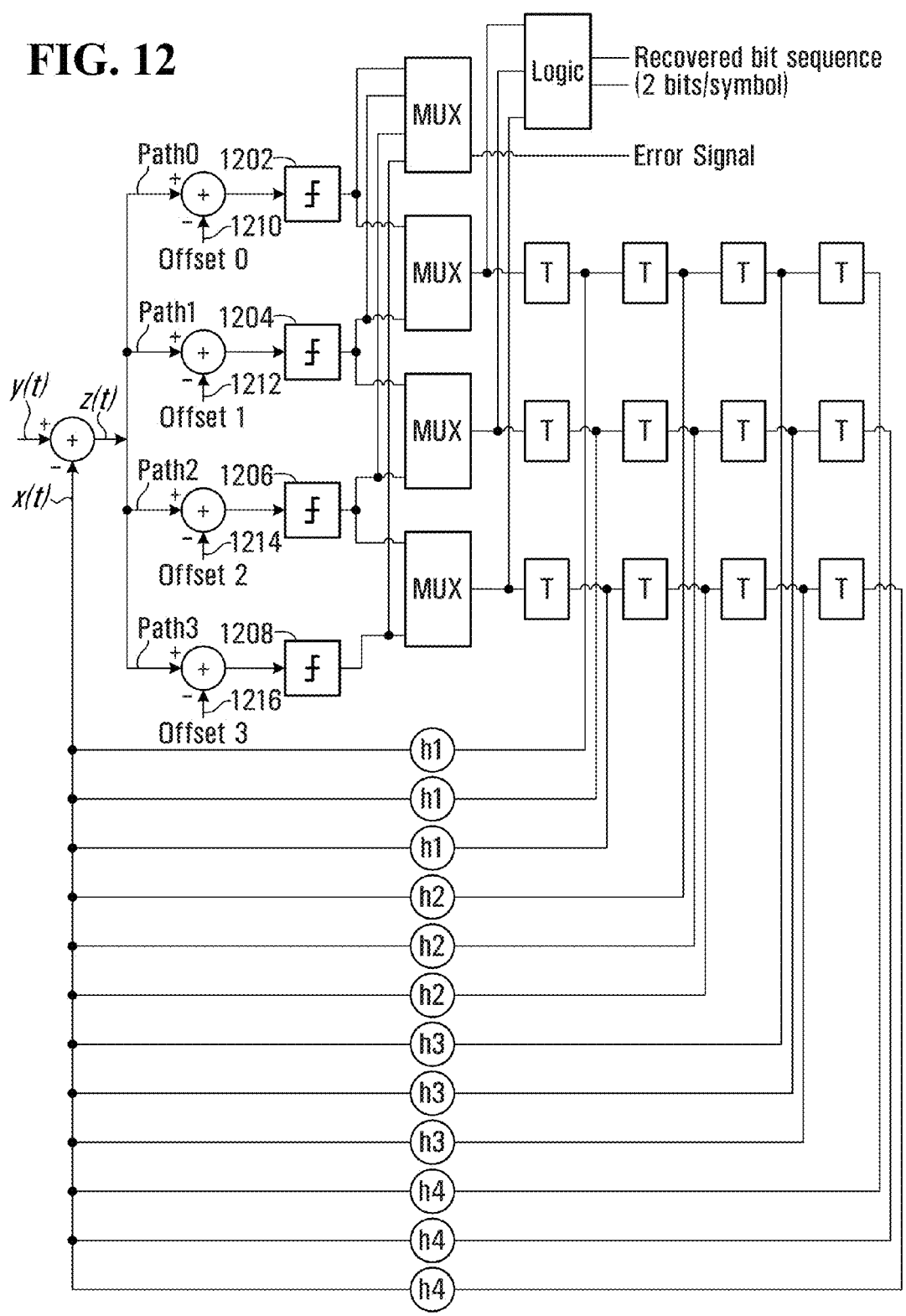

Another embodiment of an adaptive DFE with a 4-PAM modulation scheme is illustrated in FIG. 12. In this embodiment, there is no "look-ahead" (i.e. there are only direct feedback taps without any look-ahead taps) and a 4-tap feedback filter is assumed. At any given time, 3 of the 4 slicers 1202, 1204, 1206, and 1208 are used to recover the 4-PAM symbol (i.e. in a manner similar to detector 1102 in FIG. 10, which uses 3 slicers), whereas the fourth slicer is used as the offline error path to adapt the tap value(s) (when the error value is not erroneous). It will be appreciated that a number of scenarios are possible for the adaptation. One example scenario is shown in the following table:

TABLE 3

| Selected Offline Error Path | Path 0 Offset (1210) | Path 1 Offset (1212) | Path 2 Offset (1214) | Path 3 Offset (1216) | Error value valid (not erroneous) when: |
|---|---|---|---|---|---|
| Path 0 | +3 level | +2 level | 0 level | −2 level | Recovered symbol = +3 |
| Path 0 | +1 level | +2 level | 0 level | −2 level | Recovered symbol = +1 |
| Path 1 | +2 level | +1 level | 0 level | −2 level | Recovered symbol = +1 |
| Path 1 | +2 level | −1 level | 0 level | −2 level | Recovered symbol = −1 |
| Path 2 | +2 level | 0 level | −1 level | −2 level | Recovered symbol = −1 |
| Path 2 | +2 level | 0 level | −3 level | −2 level | Recovered symbol = −3 |
| Path 3 | +2 level | 0 level | −2 level | −1 level | Recovered symbol = −1 |
| Path 3 | +2 level | 0 level | −2 level | −3 level | Recovered symbol = −3 |
| Path 2 | +2 level | 0 level | +1 level | −2 level | Recovered symbol = +1 |
| Path 2 | +2 level | 0 level | −1 level | −2 level | Recovered symbol = −1 |
| Path 1 | +2 level | +3 level | 0 level | −2 level | Recovered symbol = +3 |
| Path 1 | +2 level | +1 level | 0 level | −2 level | Recovered symbol = +1 |

The symbols −3, −1, +1, +3 respectively correspond to one of the 4-PAM bit outputs. Specifically, in this embodiment, "−3" corresponds to "00", "−1" corresponds to "01", "+1" corresponds to "11", and "+3" corresponds to "10". In the embodiment of FIG. 12, one branch is selected to be taken offline to output the error value, and the other three branches (considered together) make up the decision value. It will be appreciated that the mapping of: "−3" corresponds to "00", "−1" corresponds to "01", "+1" corresponds to "11", and "+3" corresponds to "10", is only one possible implementation. Other mappings are possible (e.g. it could instead be the case that "−1" corresponds to "11" and "+1" corresponds to "01").

M-PAM Detector

In the embodiments above, examples of receiver circuitry are disclosed that incorporate an adaptive DFE. The adaptive DFE includes a plurality of branches, with each one of the branches including an adjustor to adjust a branch signal by an offset, and decision circuitry downstream from the adjustor to convert the branch signal to one of two possible output values. The offset of at least one of the plurality of branches is selectable from a finite number of values, and the offset selected is changed during operation of the DFE. The DFE further includes selection circuitry coupled to an output of each of the plurality of branches. The selection circuitry selects the output of one of the plurality of branches as an offline error value and selects the output of one or more other of the plurality of branches as a data decision value. The selection circuitry further changes which output of the plurality of branches is selected as the offline error value during the operation of the circuit such that each one of the plurality of branches is taken offline by having its output selected as the offline error value at a respective different point in time during the operation of the circuit. However, more generally this circuit structure does not need to be tied to a DFE, but can also (or instead) be part of a detector that does not include a DFE. This is discussed below in relation to FIGS. 13 to 15.

Figure 13:
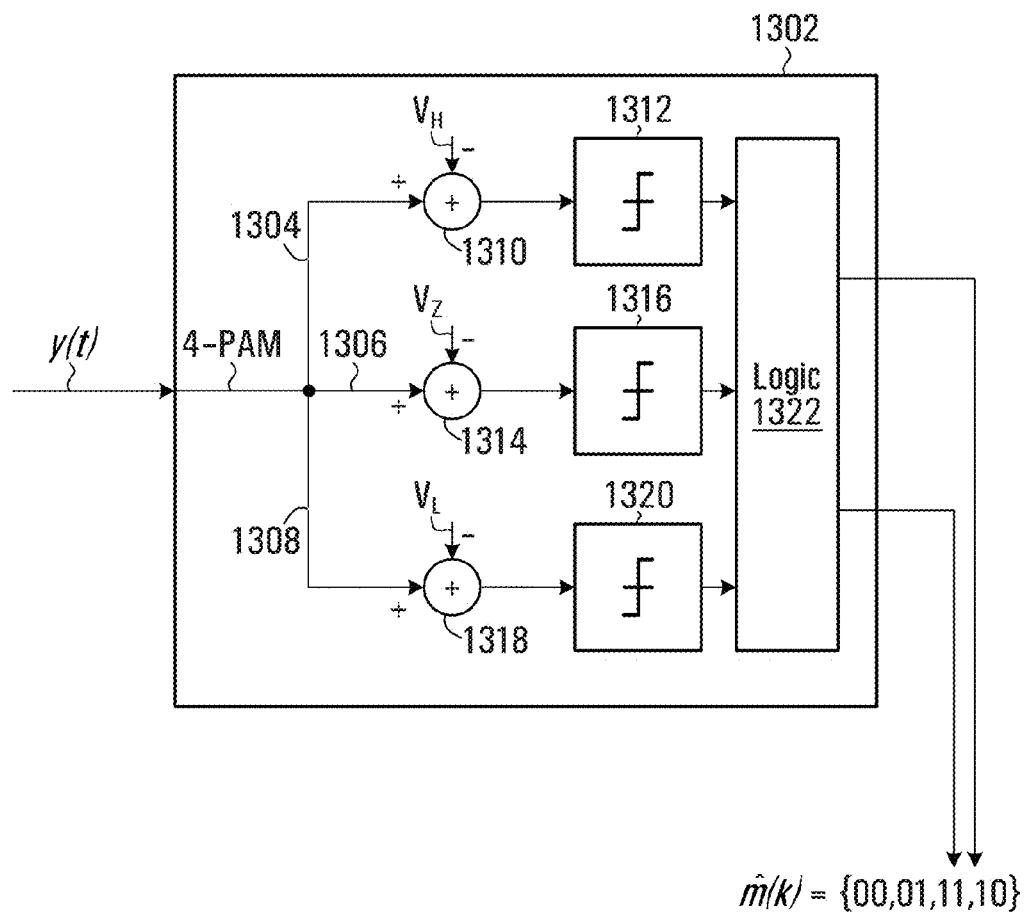
FIG. 13 is a block diagram of an embodiment of a 4-PAM detector.

FIG. 13 is a block diagram of an embodiment of a 4-PAM detector 1302 for converting an input signal y(t) into a decision $\hat{m}(k)$. The decision $\hat{m}(k)$ is one of four values: "00", "01", "11" or "10", representing 4-PAM symbols −3, −1, +1, and +3 respectively, chosen based on the value of the input signal y(t) at the time of slicing. The input signal y(t) may have been preceded by a feedforward equalizer (or a continuous time linear equalizer) and/or automatic gain control (AGC). This has not been shown in FIG. 13.

The detector 1302 includes three branches 1304, 1306, and 1308, each receiving the same input signal y(t). An adjustor 1310 adjusts the signal in branch 1304 by an offset $V_H$. Specifically, in this embodiment, the adjustor 1310 adjusts the signal y(t) in branch 1304 by subtracting offset $V_H$ from y(t). The adjustor 1310 is implemented by circuitry that performs a subtraction of two signals. A slicer 1312 is downstream from the adjustor 1310 and slices the adjusted signal y(t)–$V_H$.

Similarly, branch 1306 includes an adjustor 1314 that subtracts an offset $V_Z$ from the input signal y(t), as well as a slicer 1316 for slicing the adjusted signal, and branch 1308 includes an adjustor 1318 that subtracts an offset $V_L$ from the input signal y(t), as well as a slicer 1320.

Logic circuitry 1322 receives the output of each slicer 1312, 1316, and 1320, and converts this to a corresponding value of m̂(k).

Figure 14:
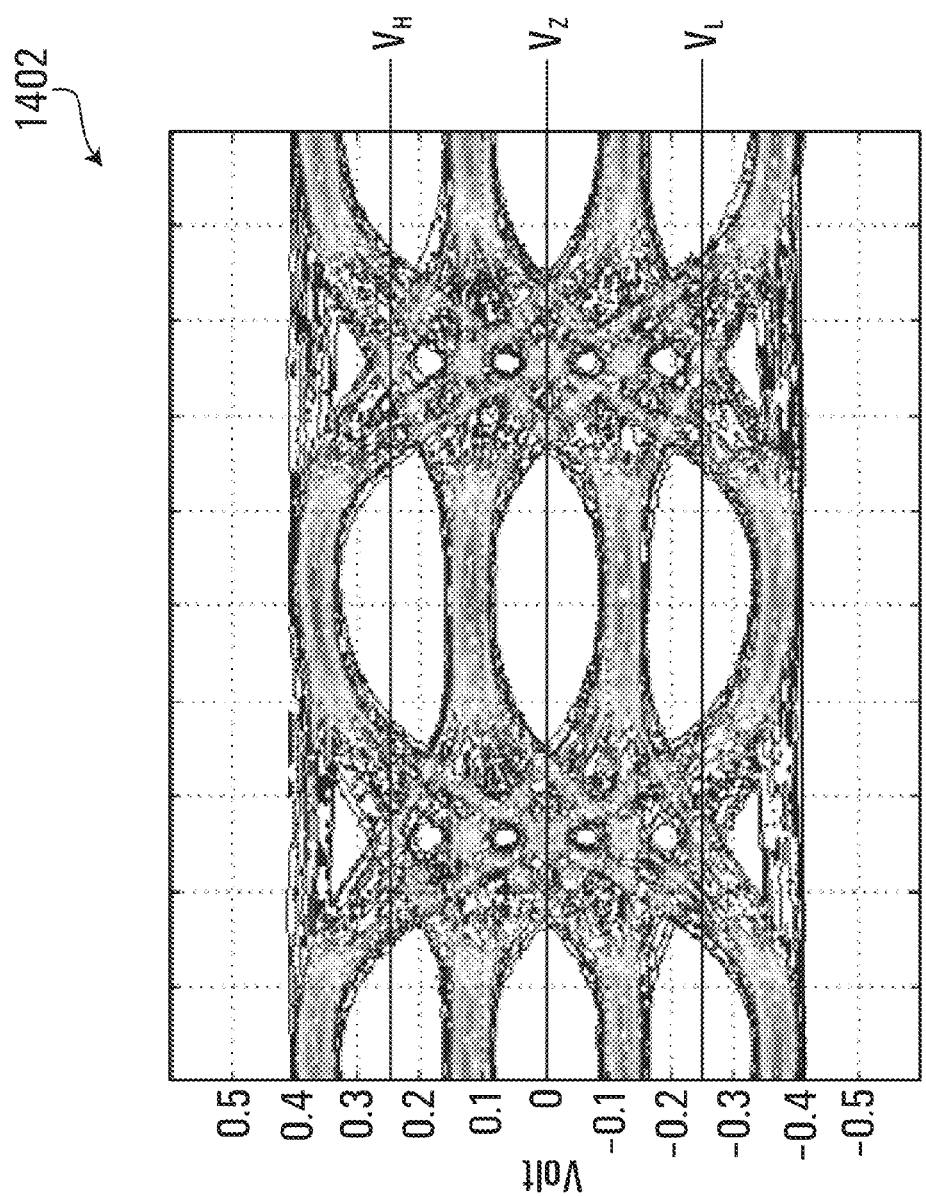
FIG. 14 is an example eye diagram of an input signal of the 4-PAM detector.

FIG. 14 is an example eye diagram 1402 of the input signal y(t). Ideally $V_H$ is a direct current (DC) offset located in the middle of the top eye (+0.25 volts in the illustrated embodiment), $V_Z$ is a DC offset located in the middle of the middle eye (0 volts in the illustrated embodiment), and $V_L$ is a DC offset located in the middle of the lower eye (−0.25 volts in the illustrated embodiment).

During operation of the detector 1302, the input signal y(t) enters each of the three branches 1304, 1306, and 1308. In branch 1304, the offset $V_H$ is subtracted from y(t) at 1310 to create y(t)–$V_H$, and that signal is then fed to slicer 1312, which outputs "1" if y(t)–$V_H$>0 (i.e. y(t)>$V_H$), and otherwise outputs "−1". Similarly, in branch 1306, the offset $V_Z$ is subtracted from y(t) at 1314 to create y(t)–$V_Z$, and that signal is then fed to slicer 1316, which outputs "1" if y(t)–$V_Z$>0 (i.e. y(t)>$V_Z$), and otherwise outputs "−1". Similarly, in branch 1308, the offset $V_L$ is subtracted from y(t) at 1318 to create y(t)–$V_L$, and that signal is then fed to slicer 1320, which outputs "1" if y(t)–$V_L$>0 (i.e. y(t)>$V_L$), and otherwise outputs "−1". The logic circuitry 1322 then converts the output of the slicers to one of the values of m̂(k) according to a truth table such as the following (where "d" represents "don't care"—i.e. it does not matter what the value is):

TABLE 4

| Slicer 1312 output | Slicer 1316 output | Slicer 1320 output | 4-PAM Level | m̂(k) |
|---|---|---|---|---|
| +1 | d | d | +3 | 10 |
| −1 | +1 | d | +1 | 11 |
| d | −1 | +1 | −1 | 01 |
| d | d | −1 | −3 | 00 |

It will be appreciated that the truth table above, which implements Gray mapping/coding, is only one possible mapping of slicer outputs/4-PAM symbols to values of m̂(k). For example, binary mapping may instead be used.

To help mitigate incorrect decisions, it is beneficial if the decision offsets $V_H$, $V_Z$, and $V_L$ correspond to the middle of their respective 4-PAM sub-eyes, as is the case in FIG. 14. In the instance shown in FIG. 14, it is the case that the optimal values are $V_H$=+0.25, $V_Z$=0, and $V_L$=−0.25. However, during operation, the optimal values of offsets $V_H$, $V_Z$, and $V_L$ may change over time due temperature and/or supply voltage drift causing gain and/or device mismatch induced DC offset variation in the 4-PAM detector and/or in the preceding circuitry (feedforward equalizer, AGC). To address this, an embodiment is illustrated in FIG. 15 in which the detector has four branches, where three act as the data paths to output the decision and one acts as an offline path so that its offset (slicing threshold) can be adapted, and where the branch selected as the offline path changes during operation so that over time all of the offsets can be updated on a periodic basis in a round-robin fashion.

Figure 15:
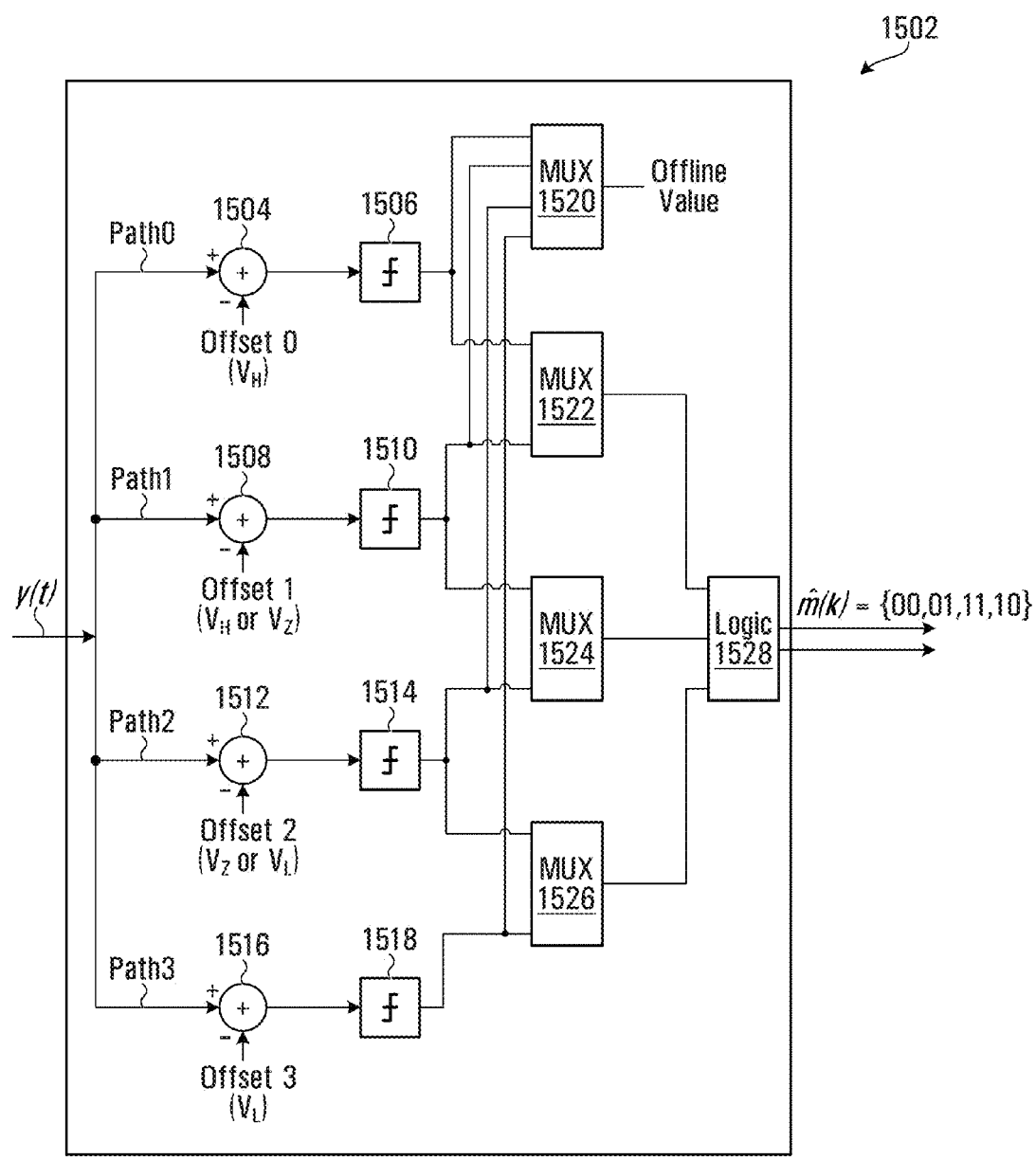
FIG. 15 is a block diagram of another embodiment of a 4-PAM detector.

Specifically, FIG. 15 is a block diagram of another embodiment of a 4-PAM detector 1502 that converts an input signal y(t) to a decision m̂(k)={00, 01, 11, 10}. The input signal y(t) may have been preceded by other circuitry, such as a feedforward equalizer (or a continuous time linear equalizer) and/or automatic gain control (AGC), but this has not been shown in FIG. 15.

The detector 1502 includes four circuit branches, or branch paths, which are respectively labelled "Path 0", "Path 1", "Path 2", and "Path 3". Each branch path receives the input signal y(t), adjusts it by an offset, and then the resulting signal is fed to a slicer. Specifically, in "PATH 0" an adjustor 1504 subtracts an "Offset 0" from y(t), and the result is sliced by slicer 1506. Similarly, in "Path 1" an adjustor 1508 subtracts an "Offset 1" from y(t), and the result is sliced by slicer 1510, in "Path 2" an adjustor 1512 subtracts an "Offset 2" from y(t), and the result is sliced by slicer 1514, and in "Path 3" an adjustor 1516 subtracts an "Offset 3" from y(t), and the result is sliced by slicer 1518.

The detector 1502 further includes multiplexers 1520, 1522, 1524, and 1526. Multiplexer 1520 receives at its input the output of each of "Path 0" to "Path 3". Multiplexer 1520 selects one of the branch paths as the offline path. Multiplexer 1522 receives at its input the output of "Path 0" and "Path 1", and selects one of these branches as a first data path. Similarly, multiplexer 1524 receives at its input the output of "Path 1" and "Path 2" and selects one of these branches as the second data path, and multiplexer 1526 receives at its input the output of "Path 2" and "Path 3" and selects one of these branches as the third data path. Logic circuitry 1528 receives the output of each of multiplexers 1522, 1524, and 1526 (i.e. the output of each of the selected data paths) and converts this to decision m̂(k), e.g. using the Table 4 truth table.

During operation of the detector 1502, the input signal y(t) travels through each of the branch paths "Path 0" to "Path 3". In each branch path, the offset is subtracted from the branch signal y(t), and then that value is sliced. For example, in "Path 0", "Offset 0" is subtracted from y(t) at 1504, and the resulting signal is sliced by slicer 1506. The multiplexer 1520 selects one of the paths as the offline path, and the multiplexers 1522, 1524, and 1526 select the other three paths as the data paths, with the path selected as the offline path being periodically changed during operation so that over time each of "Path 0" to "Path 3" is sequentially selected as the offline path in a round-robin fashion. In particular, over time the following selections are made by the multiplexers 1520, 1522, 1524, and 1526, and the following offsets are assigned to each of the selected data branches:

TABLE 5

| MUX 1520 ("Offline Path") | MUX 1522 ("First Data Path") | MUX 1524 ("Second Data Path") | MUX 1526 ("Third Data Path") |
|---|---|---|---|
| Path 0 $V_H$ adaptation Path 1 | Path 1 Offset 1 = $V_H$ Path 0 | Path 2 Offset 2 = $V_Z$ Path 2 | Path 3 Offset 3 = $V_L$ Path 3 |

TABLE 5-continued

| MUX 1520 ("Offline Path") | MUX 1522 ("First Data Path") | MUX 1524 ("Second Data Path") | MUX 1526 ("Third Data Path") |
|---|---|---|---|
| $V_Z$ adaptation Path 2 | Offset 0 = $V_H$ Path 0 | Offset 2 = $V_Z$ Path 1 | Offset 3 = $V_L$ Path 3 |
| $V_L$ adaptation Path 3 | Offset 0 = $V_H$ Path 0 | Offset 1 = $V_Z$ Path 1 | Offset 3 = $V_L$ Path 2 |
| $V_L$ adaptation Path 2 | Offset 0 = $V_H$ Path 0 | Offset 1 = $V_Z$ Path 1 | Offset 2 = $V_L$ Path 3 |
| $V_Z$ adaptation Path 1 | Offset 0 = $V_H$ Path 0 | Offset 1 = $V_Z$ Path 2 | Offset 3 = $V_L$ Path 3 |
| $V_H$ adaptation | Offset 0 = $V_H$ | Offset 2 = $V_Z$ | Offset 3 = $V_L$ |

Different sequences are also possible. However the one described in Table 5 has the following potential advantage: after the adaptation of an offline path the two inputs to the multiplexers should be identical since they originate from slicers which theoretically have the same slicing thresholds. This may remove the need to synchronize the signal controlling the multiplexer selection. It may also reduce complexity and power dissipation.

The six options outlined in the table above are cycled through during operation. The rate at which the selections are cycled through during operation is implementation specific. However, as one example, the selection may change every 20,000 symbols. When a branch path is taken offline, its output is not used to generate the decision m̂(k), rather the other three branches are used, as per Table 5 above. When a branch path is offline its slicing threshold is adapted for the 4-PAM sub-eye it is going to slice when it is placed back online.

As can be seen from Table 5 above, Offset 0 will always have the value $V_H$, and Offset 3 will always have the value $V_L$. However, Offset 1 will sometimes be set as $V_H$ and other times be set as $V_Z$ depending upon which branch is selected as the offline path. Similarly, Offset 2 will sometimes be set as $V_Z$ and other times be set as $V_L$ depending upon which branch is selected as the offline path.

When a given branch path is selected as the offline path (i.e. taken offline), its Offset value is adjusted to try to correct for gain and/or DC offset variation caused by temperature and/or supply voltage drift. One example way to adjust the Offset values is as follows:

(1) Assume that "Path 0" is first designated as the offline path. The Offset 0 value is $V_H$.

(2) The Offset 0 value is moved a pre-determined amount C above its current threshold $V_H$. That is, $V_H$+C is computed. Then, for a pre-determined number of symbols N where the received signal has a value greater than $V_H$ (i.e. for a pre-determined number of symbols N where the decision m̂(k) is "10", assuming the same mapping as in the Table 4 above), the number of times $A_0$ the signal input into the slicer 1506 is less than $V_H$+C at the time of slicing is counted. Then, the offset is moved a pre-determined amount C below the threshold $V_H$. That is, $V_H$−C is computed. Then, for the same pre-determined number of symbols N where the received signal has a value greater than $V_Z$ but less than $V_H$ (i.e. for a pre-determined number of symbols N where the decision m̂(k) is in adjacent decision region "11", assuming the same mapping as in Table 4 above), the number of times $A_1$ the signal input into the slicer 1506 is greater than $V_H$−C at the time of slicing is counted. If $A_0 > A_1$, slicing threshold $V_H$ is decreased. If $A_0 < A_1$, slicing threshold $V_H$ is increased.

(3) The process in step (2) above is then respectively repeated for "Path 1", "Path 2", and "Path 3" as per the sequence listed in Table 5. That is, "Path 1" is next taken offline (selected as the offline path) and its offset $V_Z$ separately adjusted via the same method as described for "Path 0" in step (2) above. Then "Path 2" is taken offline (selected as the offline path) and its offset $V_L$ separately adjusted via the same method. Then "Path 3" is taken offline (selected as the offline path) and its offset $V_L$ separately adjusted via the same method. Then "Path 2" is taken offline (selected as the offline path) and its offset $V_Z$ separately adjusted via the same method. Then "Path 1" is taken offline (selected as the offline path) and its offset $V_H$ separately adjusted via the same method.

(4) Steps (2) and (3) may be repeated on a periodic basis with each path being taken offline in a round-robin fashion as per the sequence described in Table 5.

Another example way to update a given offset value of a branch path is to use a least-mean-square (LMS) approach, as follows.

Each row in Table 5 has a slicing threshold $V_x$ in the offline path (where x is either H, Z, or L), as shown in the first (left-most) column of Table 5. Each slicing threshold also has an associated target 4-PAM sub-eye cursor level $H_x$ (where x is either H, Z, or L). The associated target 4-PAM sub-eye cursor level is specific to each slicing threshold to account for signal compression, and it is also adapted. There are six thresholds $V_x$ and corresponding associated target 4-PAM sub-eye cursor levels $H_x$: $V_H/H_H$ of Path 0, $V_H/H_H$ of Path 1, $V_Z/H_Z$ of Path 1, $V_Z/H_Z$ of Path 2, $V_L/H_L$ of Path 2, and $V_L/H_L$ of Path 3. Therefore, there are a total of 6 sets of $V_x/H_x$ to be adapted independently. While one set is adapted the other ones are unchanged. The updating is via an LMS adaptation scheme.

An example of $V_L/H_L$ adaptation is as follows. The LMS update equations are computed as:

$$V_L(n+1) = V_L(n) + \mu\tilde{e}(n), \text{ and} \quad (a)$$

$$H_L(n+1) = H_L(n) + \mu\tilde{e}(n) \cdot d_L(n), \quad (b)$$

where $d_L(n)$ is the output of the slicer slicing at $V_L$ and where "n" is the iteration of the update. The error value $\tilde{e}(n)$ is the sliced output of the offline branch, i.e. the sliced error e(n)=y(t)−offset, where y(t) is the detector input and offset can be set to either offset=$V_L$−$H_L$ (which is valid when m̂(k)=00 and invalid otherwise) or offset=$V_L$+$H_L$ (which is valid when m̂(k)=01 and invalid otherwise). μ is a correlation coefficient scaling factor. The updated values of $V_L$ and $H_L$ are computed using equations (a) and (b) with the slicing threshold alternating between $V_L$+$H_L$ and $V_L$−$H_L$. That is, the LMS equation iterations are computed with slicing threshold set to $V_L$+$H_L$ for a pre-defined number of valid symbols, and then the LMS equation iterations are computed with slicing threshold set to $V_L$−$H_L$ for a pre-defined number of valid symbols, and so on. When the slicing threshold is set to $V_L$−$H_L$, the error $\tilde{e}(k)$ is only valid when m̂(k)=00 (i.e −3 4-PAM level). Otherwise it is invalid and the LMS equations (a) and (b) are not updated. When the slicing threshold is set to $V_L$+$H_L$, the error $\tilde{e}(k)$ is only valid when m̂(k)=01 (i.e −1 4-PAM level). Otherwise it is invalid and the LMS equations (a) and (b) are not updated.

$V_Z/H_Z$ adaptation is similar. Specifically, the LMS update equations are computed as:

$$V_Z(n+1) = V_Z(n) + \mu\tilde{e}(n), \text{ and} \quad (a)$$

$$H_Z(n+1) = H_Z(n) + \tilde{e}(n) \cdot d_Z(n), \quad (b)$$

where $d_Z(n)$ is the output of the slicer slicing at $V_Z$ and where "n" is the iteration of the update. The error value $\tilde{e}(n)$ is the sliced output of the offline branch, i.e. the sliced error e(n)=y(t)−offset, where y(t) is the detector input and offset can be set to either offset=$V_Z$−$H_Z$ (which is valid when $\hat{m}(k)$=01 and invalid otherwise) or offset=$V_Z$+$H_Z$ (which is valid when $\hat{m}(k)$=11 and invalid otherwise). The updated values of $V_Z$ and $H_Z$ are computed using equations (a) and (b) with the slicing threshold alternating between $V_Z$+$H_Z$ and $V_Z$−$H_Z$. That is, the LMS equation iterations are computed with slicing threshold set to $V_Z$+$H_Z$ for a pre-defined number of valid symbols, and then the LMS equation iterations are computed with slicing threshold set to $V_Z$−$H_Z$ for a pre-defined number of valid symbols, and so on. When the slicing threshold is set to $V_Z$−$H_Z$, the error $\tilde{e}(k)$ is only valid when $\hat{m}(k)$=01 (i.e −1 4-PAM level). Otherwise it is invalid and the LMS equations (a) and (b) are not updated. When the slicing threshold is set to $V_Z$+$H_Z$, the error $\tilde{e}(k)$ is only valid when $\hat{m}(k)$=11 (i.e +1 4-PAM level). Otherwise it is invalid and the LMS equations (a) and (b) are not updated.

$V_H$/$H_H$ adaptation is similar. Specifically, the LMS update equations are computed as:

$$V_H(n+1)=V_H(n)+\mu\tilde{e}(n), \text{ and} \quad (a)$$

$$H_H(n+1)=H_H(n)+\mu\tilde{e}(n)\cdot d_H(n), \quad (b)$$

where $d_H(n)$ is the output of the slicer slicing at $V_H$ and where "n" is the iteration of the update. The error value $\tilde{e}(n)$ is the sliced output of the offline branch, i.e. the sliced error $e(n)$=$y(t)$−offset, where $y(t)$ is the detector input and where offset can be set to either offset=$V_H$−$H_H$ (which is valid when $\hat{m}(k)$=11 and invalid otherwise) or offset=$V_H$+$H_H$ (which is valid when $\hat{m}(k)$=10 and invalid otherwise). The updated values of $V_H$ and $H_H$ are computed using equations (a) and (b) with the slicing threshold alternating between $V_H$+$H_H$ and $V_H$−$H_H$. That is, the LMS equation iterations are computed with slicing threshold set to $V_H$+$H_H$ for a pre-defined number of valid symbols, and then the LMS equation iterations are computed with slicing threshold set to $V_H$−$H_H$ for a pre-defined number of valid symbols, and so on. When the slicing threshold is set to $V_H$−$H_H$, the error $\tilde{e}(k)$ is only valid when $\hat{m}(k)$=11 (i.e +1 4-PAM level). Otherwise it is invalid and the LMS equations (a) and (b) are not updated. When the slicing threshold is set to $V_H$+$H_H$, the error $\tilde{e}(k)$ is only valid when $\hat{m}(k)$=10 (i.e +3 4-PAM level). Otherwise it is invalid and the LMS equations (a) and (b) are not updated.

The embodiment in FIG. 15 is specific to 4-PAM. However, it will be appreciated that the offset updating methods may be generalized for M-PAM, where M>4. In this case, the detector would have M branch paths, where M−1 branches act as the data paths to make the decision, and the other left-over branch path is selected as an offline path so that its offset can be updated, and where the branch selected as the offline path changes during operation so that over time the offset of each of the M branches can be updated on a periodic basis in a round-robin fashion.

Variations and Generalizations

Many variations have already been discussed above, as is clear from the multiple embodiments described. Some further variations will be explicitly mentioned.

In the example DFE architectures described above with respect to FIGS. 1 to 12, it is assumed that when a look-ahead implementation is used (i.e. when the first tap value, or first few tap values, of the feedback filter are pre-computed in advance), there still exists a feedback filter. For example, in FIG. 6, first tap value $b_1$ is implemented using look-ahead, and so is included as an offset (at 613, 606, and 610). However, there is still a separate feedback filter component with taps $b_2$, $b_3$, and $b_4$. In an alternative implementation, it can instead be the case that the whole feedback filter is implemented using look-ahead. For example, such would be the case if FIG. 6 were modified to have only a one tap feedback filter. Taps $b_2$, $b_3$, and $b_4$ would not exist, and there would only be tap $b_1$, which would be added as an offset in the manner illustrated.

Also, the specific selection circuitry used is implementation specific. For example, FIG. 5 illustrates a 4-way switch 502, and FIGS. 6 to 8 and 15 illustrate multiplexers. These are examples of selection circuitry used for selecting the appropriate path/value in the manner disclosed.

Also, the specific way in which signals are adjusted via the adjustors is implementation specific. For example, embodiments described above have a signal in a circuit branch adjusted by an offset prior to slicing (e.g. the signal in Path 0 in FIG. 5 is adjusted by an offset 504 via adjustor 503). In the illustrated embodiments, this adjustment occurs by having the offset subtracted from the branch signal. More generally, the operation may be subtraction, addition, or multiplication. One way to implement the adjustor is to use a differential amplifier. For the case of the $z(t)$=$y(t)$−$x(t)$ operation, another example way is to use a set of open-drain differential pairs (one for $y(t)$ and one per tap in the case of computing $y(t)$) sharing a common pair of passive or active loads.

Also, as discussed above, circuitry such as the feedforward filter and the AGC are optional, and there may be other optional processing circuitry (not illustrated), such as an amplifier before the decision circuitry (e.g. before each slicer). This is implementation specific. If an AGC is used, then it may also be updated using the error value (when the error value is not erroneous).

Also, as is clear from above, the provision of a circuit that has more branches than the minimum number of data paths and bringing one branch offline to update an offset is applicable in different receiver implementations, such as adaptive DFEs and/or M-PAM detectors.

Figure 16:
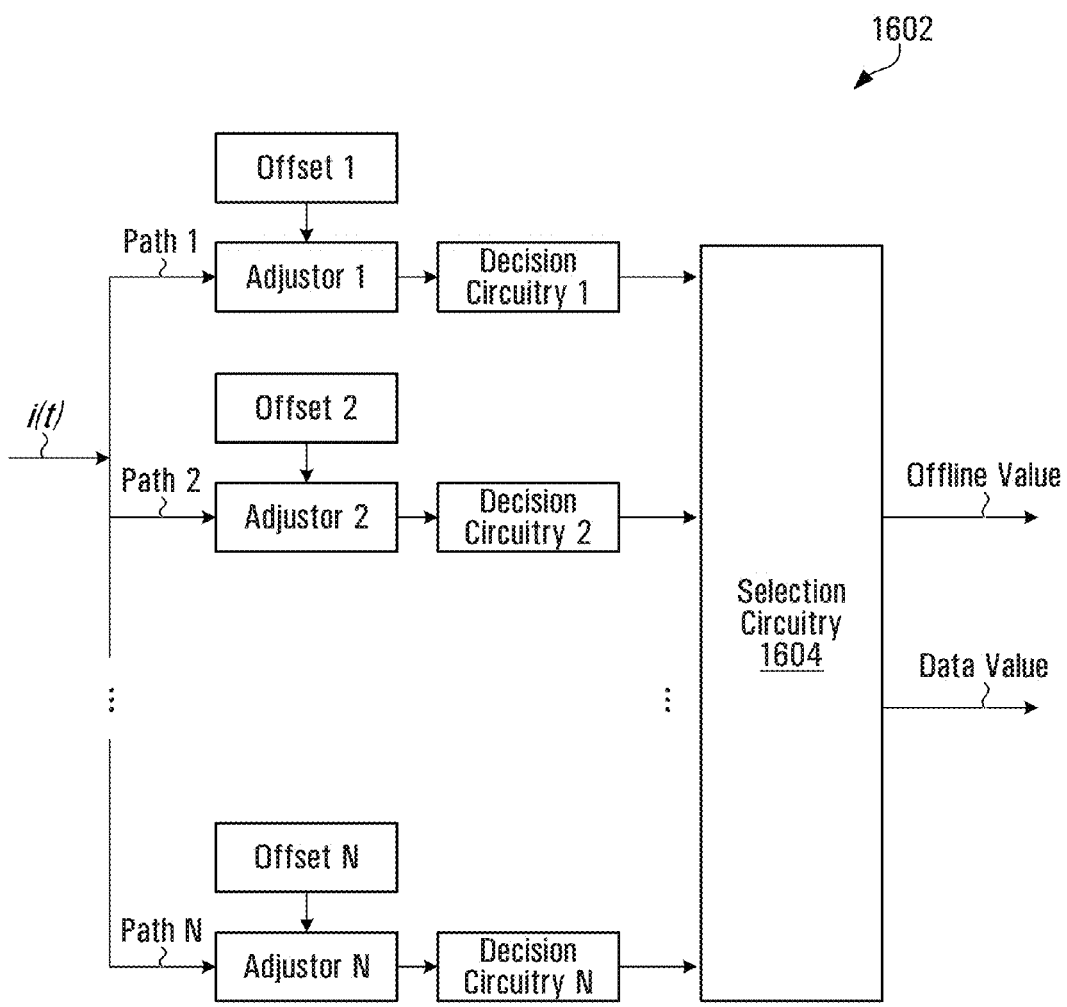
FIG. 16 is an embodiment of a circuit for use in a receiver.

FIG. 16 illustrates more generally an embodiment of a circuit 1602 for use in a receiver. The circuit 1602 has a plurality of branches labelled "Path 1" to "Path N". Each one of the plurality of branches receives the same input signal $i(t)$. Each branch includes an adjustor to adjust an input of the adjustor by an offset, and decision circuitry downstream from the adjustor to convert an input of the decision circuitry to one of two possible output values. For example, branch "Path 1" includes adjustor 1 and corresponding circuitry 1. The offset of at least one of the branches is selectable from a finite number of values, and the offset selected changes during operation of the circuit 1602. The circuit 1602 further comprises selection circuitry 1604 coupled to an output of each of the branches. The selection circuitry 1604 takes one of the branches offline by selecting the output of that branch as an offline value and selecting the output of one or more other branches as a data decision value. The selection circuitry 1604 changes which branch is taken offline by changing which output of the branches is selected as the offline value during the operation of the circuit 1602, such that each one of the plurality of branches has its output selected as the offline value at a respective different point in time during the operation of the circuit. Some examples of selection circuitry discussed above include switch(es) and/or multiplexer(s).

Each branch may be taken offline in a round-robin fashion, as is the case in some of the specific examples described above. For example, each one of the paths may be taken offline one at a time in a particular order, with that order being repeated. However, more generally, this need not be the case. For example, some branches may be taken offline several times before one or more other branches are taken offline. For a detector with a DFE, one example order in which to take the branches offline is as follows: choose the order such that (1) immediately before the offline path is about to be switched back to being a data path, the polarity of the tap(s) of the offline offset value is the same as the polarity of the tap(s) of the data path about to be taken offline, and (2) when the offline path switches, the polarity of the taps on the new data paths are not changed from their previous polarities. By choosing this order, the circuit may operate in a more glitchless fashion.

In some embodiments, at least one offset value associated with the branch taken offline may be adapted (updated) when the branch is offline. For example, in the case of the DFE implementations described earlier, adaption may occur if the offline value is not erroneous. In the case of the 4-PAM detector implementations described earlier, adaption of the offset associated with the offline branch ($V_H$, $V_Z$, or $V_L$) may be performed.

Although the FIG. 16 embodiment shows the input signal i(t) being adjusted in each branch path, it may instead be the case that a modified version of the input signal i(t) is adjusted (e.g. if one, some, or all of the branches had processing circuitry upstream from the adjustor). Therefore, more generally the input to each adjustor is equal to or based on the input signal i(t). Similarly, although the FIG. 16 embodiment shows the output of the adjustor being fed directly into the decision circuitry, there may be some sort of signal processing (e.g. amplification) prior to entering the decision circuitry. Therefore, more generally, the input to the decision circuitry is equal to or based on the output of the adjustor. Similarly, the output of the decision circuitry may be processed prior to being sent to the selection circuitry 1604. That is, the output signal of each branch, which is processed and/or selected by the selection circuitry 1604, may be equal to or based on the output of the decision circuitry.

In some embodiments, the input signal i(t) is an equalized signal (e.g. i(t)=z(t) in FIGS. 5 to 8). In other embodiments it is not necessarily an equalized signal (e.g. as in FIG. 15). In some embodiments, the circuit 1602 may be a detector without a DFE (e.g. as in FIG. 15). In other embodiments, the circuit may perform adaptive DFE and detection (e.g. as in FIG. 7). In some embodiments, the decision circuitry is a binary PAM or NRZ detector, which may be in the form of a slicer. In some embodiments, the adjustors subtract the offset from the branch signal, although addition or multiplication may be used instead.

In some embodiments, the branch having its output selected as the offline value is called the offline branch. This is because the output of the branch is an offline value, rather than a data decision value. In the case of a DFE, the offline branch may be called the "offline error computation branch" or the "offline error branch".

The circuit 1602 may further comprise comparison circuitry (not illustrated in FIG. 16) to compare the offset of the offline branch to at least the data decision value to determine whether the offline value is erroneous. An example of comparison circuitry is one or more comparators and/or associated logic, as discussed in the embodiments described earlier.

In some embodiments, the offline value may be used to update at least one offset value of the offline branch when the offline value is not erroneous.

In some embodiments, the offset that can be selected for each branch of the plurality of branches incorporates at least a DFE filter tap.

In some embodiments, the offset of the offline branch includes at least: a first component corresponding to a possible data decision value and a second component corresponding to a DFE filter tap multiplied by a previous data decision value, and the offline value is considered erroneous when: (i) the first component does not match an actual data decision value, or (ii) the second component does not match the DFE filter tap multiplied by an actual previous data decision value.

In some embodiments, the offset selected for each branch is different from the offset selected for each other branch.

In some embodiments, the circuit 1602 further comprises adjustment circuitry (not illustrated in FIG. 16) to adjust an offset value of the offline branch.

In some embodiments, the circuit 1602 comprises a 4-PAM detector, and there are four branches. During operation one of the four branches is selected as the offline branch, and the output of the other three branches form the data decision value. The offline branch selected is to change during operation such that each one of the four branches is the offline branch at a respective different point in time during the operation of the circuit, and the remaining three branches form the data decision value. In some of such embodiments, the offset of a first branch of the four branches is a DC value that is to be adjusted during operation of the circuit when the first branch is selected as the offline branch. The offset of a second branch of the four branches takes one of two possible DC values depending upon which branch of the plurality of branches is selected as the offline branch, and at least one of the two possible DC values of the offset of the second branch are to be adjusted during operation of the circuit when the second branch is selected as the offline branch. The offset of a third branch of the four branches takes one of two possible DC values depending upon which branch of the plurality of branches is selected as the offline branch, and at least one of the two possible DC values of the offset of the third branch are to be adjusted during operation of the circuit when the third branch is selected as the offline branch. The offset of a fourth branch of the four branches is a DC value that is to be adjusted during operation of the circuit when the fourth branch is selected as the offline branch.

In some embodiments, the adjustment circuitry is to adjust the value of the offset of the offline branch by: adjusting the value of the offset by a pre-determined amount C above a current offset value V to obtain V+C; for a pre-determined number of symbols N for which a received signal (the input signal into the branches) has a value greater than V, counting a number of times a signal input into decision circuitry associated with the offline branch is less than V+C to obtain $A_0$; adjusting the value of the offset by the pre-determined amount C below the current offset value V to obtain V−C; for a same pre-determined number of symbols N during which the received signal has a value less than V but greater than an adjacent decision threshold, counting a number of times a signal input into decision circuitry associated with the offline branch is greater than V−C to obtain $A_1$; decreasing the current offset value if $A_0 > A_1$, and increasing the current offset value if $A_0 < A_1$.

In some embodiments, the circuit 1602 cycles through the plurality of branches, ensuring that each one of the plurality of branches, at some point during the cycle, is used to generate the offline value (e.g. the error value in the case of the DFE implementations). The cycle may be periodic. During the cycle, it may be the case in some embodiments that each branch has its output selected as the offline value more than once at different points in the cycle.

In some embodiments, the offline value is not used to update offsets of any branches except the offline branch.

In some embodiments, the circuit 1602 comprises an adaptive DFE including: a feedback filter having an input, an output, and at least one filter tap. Optionally, in such embodiments, the decision value is fed to the input of the feedback filter, and the output of the feedback filter is combined with an input of the plurality of branches. Optionally, in some embodiments, when the offline (error) value is not erroneous, it is used to update the at least one filter tap of the feedback filter.

In some embodiments, each offset is a DC value. That being said, as mentioned earlier, the selected offset changes during operation. Therefore, in this sense, the DC offset value would vary over time (i.e. change as each selected offset changes). That is, the selected offset can be considered to vary slowly over time, although each offset selected itself would be a DC value.

In some embodiments, the number of branches equals $1+2^n$, where n represents a number of filter taps incorporated into each offset value.

Figure 17:
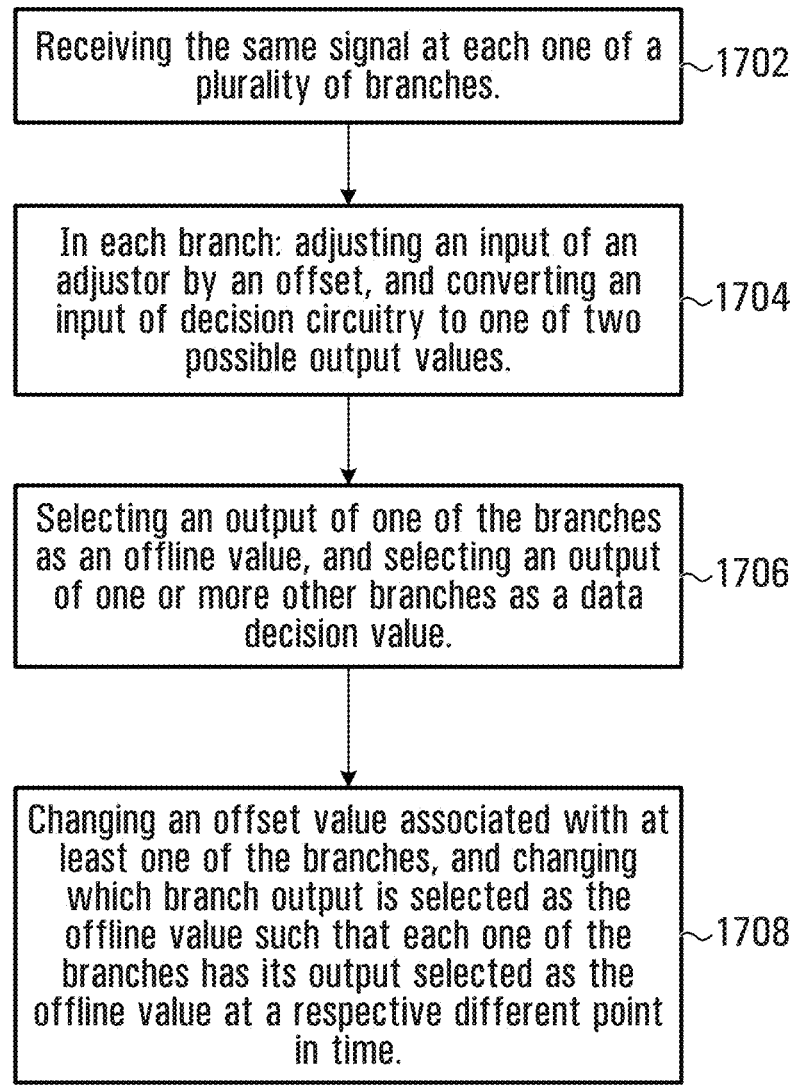
FIG. 17 is a flow diagram illustrating one embodiment a method of operating a circuit in a receiver.

With reference to FIG. 17, there is also generally provided in one embodiment a method of operating a circuit in a receiver. Specifically, in step 1702, a same signal is received at an input of each one of a plurality of branches. Each one of the plurality of branches includes an adjustor and decision circuitry downstream from the adjustor. In each one of the plurality of branches, the following is performed at step 1704: adjusting an input of the adjustor by an offset, and converting an input of the decision circuitry to one of two possible output values. In step 1706, an output of one of the plurality of branches is selected as an offline value, and an output of one or more other of the plurality of branches is selected as a data decision value. During operation of the circuit, the following is performed in step 1708: (i) changing a value of the offset associated with at least one of the plurality of branches, the value of the offset being changed from one of a finite number of values to another of the finite number of values; and (ii) changing which output of the plurality of branches is selected as the offline value such that each one of the plurality of branches has its output selected as the offline value at a respective different point in time during the operation of the circuit.

In some embodiments, in step (i), changing a value of the offset associated with at least one of the plurality of branches may comprise changing a value of the offset associated with each one of the plurality of branches. In such a case, the offset changed for each branch may be selected from a finite number of values.

Although the foregoing has been described with reference to certain specific embodiments, various modifications thereof will be apparent to those skilled in the art without departing from the scope of the claims appended hereto.

What is claimed is:

1. A receiver comprising:
    a plurality of branches, each one of the plurality of branches to receive the same input signal, and each one of the plurality of branches including:
        an adjustor to adjust an input of the adjustor by an offset; and
        decision circuitry downstream from the adjustor to convert an input of the decision circuitry to one of two possible output values;
    wherein the offset associated with at least one of the plurality of branches is selectable from a finite number of values, and the offset selected is to change during an operation of the receiver;
    the receiver further comprising selection circuitry coupled to an output of each of the plurality of branches, the selection circuitry to select the output of one of the plurality of branches as an offline value and to select the output of one or more other of the plurality of branches as a data decision value; and
    the receiver further to change which output of the plurality of branches is selected as the offline value during the operation of the receiver such that each one of the plurality of branches has an output selected as the offline value at a respective different point in time during the operation of the receiver;
    the branch having the output selected as the offline value is an offline error computation branch, and the receiver further comprising comparison circuitry to compare the offset associated with the offline error computation branch to at least the data decision value to determine whether the offline value is erroneous.

2. The receiver of claim 1, wherein the offline value is used to update at least one offset value associated with the offline error computation branch when the offline value is not erroneous.

3. The receiver of claim 2, wherein the offset for each branch of the plurality of branches incorporates at least a filter tap.

4. The receiver of claim 1, wherein the offset for each branch of the plurality of branches incorporates at least a filter tap.

5. The receiver of claim 1, wherein the offset associated with the offline error computation branch includes at least: a first component corresponding to a possible data decision value and a second component corresponding to a filter tap multiplied by a previous data decision value, and the offline value is to be considered erroneous when: (i) the first component does not match an actual data decision value, or (ii) the second component does not match the filter tap multiplied by an actual previous data decision value.

6. The receiver of claim 1, wherein the offset selected for each branch of the plurality of branches is different from the offset selected for each other branch of the plurality of branches.

7. The receiver of claim 2, wherein the offset selected for each branch of the plurality of branches is different from the offset selected for each other branch of the plurality of branches.

8. A receiver incorporating a 4-PAM detector, the receiver comprising:
    four branches, each one of the four branches to receive the same input signal, and each one of the four branches including:
        an adjustor to adjust an input of the adjustor by an offset; and
        decision circuitry downstream from the adjustor to convert an input of the decision circuitry to one of two possible output values;
    wherein the offset associated with at least one of the four branches is selectable from a finite number of values, and the offset selected is to change during an operation of the receiver;
    the receiver further comprising selection circuitry coupled to an output of each of the four branches, the selection circuitry to select the output of one of the four branches as an offline value and to select the output of one or more other of the four branches as a data decision value; and
    the selection circuitry further to change which output of the four branches is selected as the offline value during the operation of the receiver such that each one of the four branches has an output selected as the offline value at a respective different point in time during the operation of the receiver;

wherein the branch having the output selected as the offline value is an offline branch, and the receiver further comprises adjustment circuitry to adjust an offset value associated with the offline branch;

wherein during the operation of the receiver one of the four branches is the offline branch, and the output of the other three branches form the data decision value, and the offline branch is to change during the operation of the receiver such that each one of the four branches is the offline branch at the respective different point in time during the operation of the receiver and the remaining three branches form the data decision value; and wherein:

the offset of a first branch of the four branches is a direct current (DC) value that is adjusted during the operation of the receiver when the first branch is the offline branch;

one of two possible DC values is selected as the offset of a second branch of the four branches, and which one of the two possible DC values selected is dependent upon which branch of the four branches is the offline branch, and wherein at least one of the two possible DC values of the offset of the second branch is adjusted during the operation of the receiver when the second branch is the offline branch;

one of two possible DC values is selected as the offset of a third branch of the four branches, and which one of the two possible DC values selected is dependent upon which branch of the four branches is the offline branch, and wherein at least one of the two possible DC values of the offset of the third branch is adjusted during the operation of the receiver when the third branch is the offline branch; and the offset of a fourth branch of the four branches is a DC value that is adjusted during the operation of the receiver when the fourth branch is the offline branch.

9. The receiver of claim 8, wherein the adjustment circuitry is to adjust the offset value associated with the offline branch by performing operations to:

adjust the offset value by adding a pre-determined amount C to a current offset value V to obtain V+C, wherein V and C are real numbers;

for a pre-determined number of symbols N for which the input signal has a value greater than V, count a number of times a signal input into the decision circuitry of the offline branch is less than V+C to obtain $A_0$, wherein N and $A_0$ are integers;

adjust the offset value by subtracting the pre-determined amount C from the current offset value V to obtain V−C;

for a same pre-determined number of symbols N for which the input signal has a value less than V but greater than an adjacent decision threshold, count a number of times a signal input into the decision circuitry of the offline branch is greater than V−C to obtain $A_1$, wherein $A_1$ is an integer;

decrease the current offset value if $A_0 > A_1$, and increase the current offset value if $A_0 < A_1$.

10. A receiver comprising:

a plurality of branches, each one of the plurality of branches to receive the same input signal, and each one of the plurality of branches including:

an adjustor to adjust an input of the adjustor by an offset; and decision circuitry downstream from the adjustor to convert an input of the decision circuitry to one of two possible output values;

wherein the offset associated with at least one of the plurality of branches is selectable from a finite number of values, and the offset selected is to change during an operation of the receiver;

the receiver further comprising selection circuitry coupled to an output of each of the plurality of branches, the selection circuitry to select the output of one of the plurality of branches as an offline value and to select the output of one or more other of the plurality of branches as a data decision value; and the selection circuitry further to change which output of the plurality of branches is selected as the offline value during the operation of the receiver such that each one of the plurality of branches has an output selected as the offline value at a respective different point in time during the operation of the receiver;

wherein the branch having the output selected as the offline value is an offline branch, and the receiver further comprises adjustment circuitry to adjust an offset value associated with the offline branch;

and wherein the adjustment circuitry is to adjust the offset value associated with the offline branch by performing operations to:

adjust the offset value by adding a pre-determined amount C to a current offset value V to obtain V+C, wherein V and C are real numbers;

for a pre-determined number of symbols N for which the input signal has a value greater than V, count a number of times a signal input into the decision circuitry of the offline branch is less than V+C to obtain $A_0$, wherein N and $A_0$ are integers;

adjust the offset value by subtracting the pre-determined amount C from the current offset value V to obtain V−C;

for a same pre-determined number of symbols N for which the input signal has a value less than V but greater than an adjacent decision threshold, count a number of times a signal input into the decision circuitry of the offline branch is greater than V−C to obtain $A_1$, wherein $A_1$ is an integer;

decrease the current offset value if $A_0 > A_1$, and increase the current offset value if $A_0 < A_1$.

11. A method of operating a receiver comprising:

receiving the same signal at an input of each one of a plurality of branches, each one of the plurality of branches including an adjustor and decision circuitry downstream from the adjustor;

in each one of the plurality of branches: adjusting an input of the adjustor by an offset, and converting an input of the decision circuitry to one of two possible output values;

selecting an output of one of the plurality of branches as an offline value, and selecting an output of one or more other of the plurality of branches as a data decision value;

during an operation of the receiver:

(i) changing a value of the offset associated with at least one of the plurality of branches, the value of the offset being changed from one of a finite number of values to another of the finite number of values; and (ii) changing which output of the plurality of branches is selected as the offline value such that each one of the plurality of branches has an output selected as the offline value at a respective different point in time during the operation of the receiver;

wherein the branch having the output selected as the offline value is an offline error computation branch, and the method further comprises comparing the offset associated the offline error computation branch to at least the data decision value to determine whether the offline value is erroneous.

12. The method of claim 11, further comprising using the offline value to update at least one offset value associated with the offline error computation branch when the offline value is not erroneous.

13. The method of claim 12, wherein the offset for each branch of the plurality of branches incorporates at least a filter tap.

14. The method of claim 11, wherein the offset for each branch of the plurality of branches incorporates at least a filter tap.

15. The method of claim 11, wherein the offset associated with the offline error computation branch includes at least: a first component corresponding to a possible data decision value and a second component corresponding to a filter tap multiplied by a previous data decision value, and the method further comprising determining that the offline value is erroneous when: (i) the first component does not match an actual data decision value, or (ii) the second component does not match the filter tap multiplied by an actual previous data decision value.

16. The method of claim 11, further comprising selecting the value of the offset for each one of the plurality of branches so that the offset selected for each branch of the plurality of branches has a different value from the offset selected for each other branch of the plurality of branches.

17. The method of claim 12, further comprising selecting the value of the offset for each one of the plurality of branches so that the offset selected for each branch of the plurality of branches has a different value from the offset selected for each other branch of the plurality of branches.

18. A method of operating a receiver, the receiver incorporating a 4-PAM detector, and the method comprising:
receiving the same signal at an input of each one of four branches, each one of the four branches including an adjustor and decision circuitry downstream from the adjustor;
in each one of the four branches: adjusting an input of the adjustor by an offset, and converting an input of the decision circuitry to one of two possible output values;
selecting an output of one of the four branches as an offline value, and selecting an output of one or more other of the four branches as a data decision value;
during an operation of the receiver:
(i) changing a value of the offset associated with at least one of the four branches, the value of the offset being changed from one of a finite number of values to another of the finite number of values; and
(ii) changing which output of the four branches is selected as the offline value such that each one of the four branches has an output selected as the offline value at a respective different point in time during the operation of the receiver;
wherein the branch having the output selected as the offline value is an offline branch, and the method further comprises adjusting an offset value associated with the offline branch;
wherein during the operation of the receiver one of the four branches is the offline branch, and the output of the other three branches form the data decision value; and wherein the method further comprises changing the offline branch during the operation of the receiver such that each one of the four branches is the offline branch at the respective different point in time during the operation of the receiver and the remaining three branches form the data decision value;
and wherein:
the offset of a first branch of the four branches is a direct current (DC) value that is adjusted during the operation of the receiver when the first branch is the offline branch;
one of two possible DC values is selected as the offset of a second branch of the four branches, and which one of the two possible DC values selected is dependent upon which branch of the four branches is the offline branch, and wherein at least one of the two possible DC values of the offset of the second branch is adjusted during the operation of the receiver when the second branch is the offline branch;
one of two possible DC values is selected as the offset of a third branch of the four branches, and which one of the two possible DC values selected is dependent upon which branch of the four branches is the offline branch, and wherein at least one of the two possible DC values of the offset of the third branch is adjusted during the operation of the receiver when the third branch is the offline branch; and
the offset of a fourth branch of the four branches is a DC value that is adjusted during the operation of the receiver when the fourth branch is the offline branch.

19. The method of claim 18, wherein adjusting the offset value associated with the offline branch comprises:
adjusting the offset value by adding a pre-determined amount C to a current offset value V to obtain V+C, wherein V and C are real numbers;
for a pre-determined number of symbols N for which the input signal has a value greater than V, counting a number of times a signal input into the decision circuitry of the offline branch is less than V+C to obtain $A_0$, wherein N and $A_0$ are integers;
adjusting the offset value by subtracting the pre-determined amount C from the current offset value V to obtain V−C;
for a same pre-determined number of symbols N for which the input signal has a value less than V but greater than an adjacent decision threshold, counting a number of times a signal input into the decision circuitry of the offline branch is greater than V−C to obtain $A_1$, wherein $A_1$ is an integer;
decreasing the current offset value if $A_0 > A_1$, and increasing the current offset value if $A_0 < A_1$.

20. A method performed in a receiver, the method comprising:
receiving the same signal at an input of each one of a plurality of branches, each one of the plurality of branches including an adjustor and decision circuitry downstream from the adjustor;
in each one of the plurality of branches: adjusting an input of the adjustor by an offset, and converting an input of the decision circuitry to one of two possible output values;
selecting an output of one of the plurality of branches as an offline value, and selecting an output of one or more other of the plurality of branches as a data decision value;
during an operation of the receiver:
(i) changing a value of the offset associated with at least one of the plurality of branches, the value of the offset being changed from one of a finite number of values to another of the finite number of values; and (ii) changing which output of the plurality of branches is selected as the offline value such that each one of the plurality of branches has an output selected as the offline value at a respective different point in time during the operation of the receiver;

wherein the branch having the output selected as the offline value is an offline branch, and the method further comprises adjusting an offset value associated with the offline branch;

and wherein adjusting the offset value associated with the offline branch comprises:

adjusting the offset value by adding a pre-determined amount C to a current offset value V to obtain V+C, wherein V and C are real numbers;

for a pre-determined number of symbols N for which the input signal has a value greater than V, counting a number of times a signal input into the decision circuitry of the offline branch is less than V+C to obtain $A_0$, wherein N and $A_0$ are integers;

adjusting the offset value by subtracting the pre-determined amount C from the current offset value V to obtain V−C;

for a same pre-determined number of symbols N for which the input signal has a value less than V but greater than an adjacent decision threshold, counting a number of times a signal input into the decision circuitry of the offline branch is greater than V−C to obtain $A_1$, wherein $A_1$ is an integer;

decreasing the current offset value if $A_0 > A_1$, and increasing the current offset value if $A_0 < A_1$.

21. A receiver incorporating an M-PAM detector, where M is an integer greater than or equal to four, the receiver comprising:

M branches, each one of the M branches to receive the same input signal, and each one of the M branches including:

an adjustor to adjust an input of the adjustor by an offset; and decision circuitry downstream from the adjustor to convert an input of the decision circuitry to one of two possible output values;

wherein the offset associated with at least one of the M branches is selectable from a finite number of values, and the offset selected is to change during an operation of the receiver;

the receiver further comprising selection circuitry coupled to an output of each of the M branches, the selection circuitry to select the output of one of the M branches as an offline value and to select the output of one or more other of the M branches as a data decision value; and the selection circuitry further to change which output of the M branches is selected as the offline value during the operation of the receiver such that each one of the M branches has an output selected as the offline value at a respective different point in time during the operation of the receiver;

wherein the branch having the output selected as the offline value is an offline branch, and the receiver further comprises adjustment circuitry to adjust an offset value associated with the offline branch;

wherein during the operation of the receiver one of the M branches is the offline branch, and the output of the other M−1 branches form the data decision value, and the offline branch is to change during the operation of the receiver such that each one of the M branches is the offline branch at the respective different point in time during the operation of the receiver and the remaining M−1 branches form the data decision value;

and wherein:

the offset of a first branch of the M branches is a direct current (DC) value that is adjusted during the operation of the receiver when the first branch is the offline branch;

the offset of an $M^{th}$ branch of the M branches is a DC value that is adjusted during the operation of the receiver when the $M^{th}$ branch is the offline branch;

for each other branch of the M branches: one of two possible DC values is selected as the offset for the branch, and which one of the two possible DC values selected is dependent upon which branch of the M branches is the offline branch, and wherein at least one of the two possible DC values is adjusted during the operation of the receiver when the branch is the offline branch.

22. A method of operating a receiver, the receiver incorporating an M-PAM detector, where M is an integer greater than or equal to four, and the method comprising:

receiving the same signal at an input of each one of M branches, each one of the M branches including an adjustor and decision circuitry downstream from the adjustor;

in each one of the M branches: adjusting an input of the adjustor by an offset, and converting an input of the decision circuitry to one of two possible output values;

selecting an output of one of the M branches as an offline value, and selecting an output of one or more other of the M branches as a data decision value;

during an operation of the receiver:

(i) changing a value of the offset associated with at least one of the M branches, the value of the offset being changed from one of a finite number of values to another of the finite number of values; and (ii) changing which output of the M branches is selected as the offline value such that each one of the M branches has an output selected as the offline value at a respective different point in time during the operation of the receiver;

wherein the branch having the output selected as the offline value is an offline branch, and the method further comprises adjusting an offset value associated with the offline branch;

wherein during the operation of the receiver one of the M branches is the offline branch, and the output of the other M−1 branches form the data decision value; and wherein the method further comprises changing the offline branch during the operation of the receiver such that each one of the M branches is the offline branch at the respective different point in time during the operation of the receiver and the remaining M−1 branches form the data decision value;

and wherein:

the offset of a first branch of the M branches is a direct current (DC) value that is adjusted during the operation of the receiver when the first branch is the offline branch;

the offset of an $M^{th}$ branch of the M branches is a DC value that is adjusted during the operation of the receiver when the $M^{th}$ branch is the offline branch;

for each other branch of the M branches: one of two possible DC values is selected as the offset for the branch, and which one of the two possible DC values selected is dependent upon which branch of the M branches is the offline branch, and wherein at least one of the two possible DC values is adjusted during the operation of the receiver when the branch is the offline branch.

\* \* \* \* \*